United States Patent [19]
Kato et al.

[11] Patent Number: 5,575,232
[45] Date of Patent: Nov. 19, 1996

[54] METHOD AND DEVICE FOR REDUCING FRICTION ON A NAVIGATING VEHICLE

[75] Inventors: Hiroharu Kato, 5-31-9, Koganehara, Matsudo-shi, Chiba-ken; Yoshiaki Takahashi, Tokyo, both of Japan

[73] Assignees: Hiroharu Kato, Chiba-ken; Ishikawajima-Harima Heavy Industries Co., Ltd., Tokyo, both of Japan

[21] Appl. No.: 360,731

[22] Filed: Dec. 21, 1994

[30] Foreign Application Priority Data

| May 11, 1993 | [JP] | Japan | 5-109547 |
| Oct. 13, 1993 | [JP] | Japan | 5-256162 |

[51] Int. Cl.⁶ ............................................. B63B 1/38
[52] U.S. Cl. ............................................. 114/67 A
[58] Field of Search ............................ 114/67 R, 67 A

[56] References Cited

U.S. PATENT DOCUMENTS

| 2,764,954 | 10/1956 | Deltgen | 114/67 A |
| 2,954,750 | 10/1960 | Crump et al. | 114/67 A |
| 3,084,651 | 4/1963 | Parmenter | 114/67 A |
| 3,125,977 | 3/1964 | kurihara . | |
| 3,289,623 | 12/1966 | Gray et al. | 114/67 A |
| 3,342,032 | 9/1967 | Cox et al. | 114/67 A |
| 4,543,900 | 10/1985 | Aker | 114/67 A |
| 4,987,844 | 1/1991 | Nadolink | 114/67 A |
| 5,031,559 | 7/1991 | Bartholomew | 114/67 A |
| 5,240,650 | 8/1993 | Wiederhold et al. | 261/76 |

FOREIGN PATENT DOCUMENTS

| 1434322 | 2/1966 | France . | |
| 2599437 | 12/1987 | France . | |
| 9111657 | 1/1992 | Germany . | |
| 50-83992 | 7/1975 | Japan . | |
| 52-18691 | 2/1977 | Japan . | |
| 53-136289 | 11/1978 | Japan . | |
| 53-158095 | 12/1978 | Japan . | |
| 56-167584 | 12/1981 | Japan . | |
| 58-47690 | 3/1983 | Japan . | |
| 60-139586 | 7/1985 | Japan . | |
| 60-163784 | 8/1985 | Japan . | |
| 61-41685 | 2/1986 | Japan . | |
| 61-39691 | 3/1986 | Japan . | |
| 61-81283 | 4/1986 | Japan . | |
| 61-71290 | 4/1986 | Japan . | |
| 61-128185 | 8/1986 | Japan . | |
| 61-128184 | 8/1986 | Japan . | |
| 62-88697 | 6/1987 | Japan . | |
| 63-42724 | 2/1988 | Japan . | |
| 63-94894 | 6/1988 | Japan . | |
| 3-246188 | 11/1991 | Japan . | |
| 4-287788 | 10/1992 | Japan . | |
| 710596 | 6/1954 | United Kingdom | 114/67 A |

OTHER PUBLICATIONS

European Search Report dated Sep. 7, 1995.

*Primary Examiner*—Sherman Basinger
*Attorney, Agent, or Firm*—Pearne, Gordon, McCoy & Granger

[57] ABSTRACT

A method for reducing the frictional resistance of a navigating vehicle, and a method for generating micro-bubbles for reducing the friction of the navigating vehicle and an apparatus therefor. The friction reduction is achieved with the expenditure of a small amount of energy, thereby improving the overall energy efficiency for operating the ship. An air bubble/water mixture is injected towards the stern of the ship, at an inclined angle to the underwater surface, into a boundary layer formed in the vicinity of the underwater surface of the ship. The friction reduction is effectively performed because of the dynamic energy of the water, being a larger mass than air, enables the gas-including mixture to be injected over a longer distance into the boundary layer than in the case of air bubbles alone.

13 Claims, 22 Drawing Sheets

METHOD AND DEVICE FOR REDUCING FRICTION ON A NAVIGATING VEHICLE

BACKGROUND OF THE INVENTION

1. Field of the Invention

This invention relates to a method for reducing the frictional resistance of a navigating vehicle, and a method and an apparatus for generating micro-bubbles for reducing the friction in a low friction navigating vehicle. Especially, it is related to a technique of jetting micro-bubbles, composed of a mixture of air bubbles and water, out from the underwater surface of a ship, thereby reducing the frictional resistance as well as improving the overall energy utilization efficiency by making use of the dynamic energy of the mixture as a thrusting force.

2. Description of Related Art

There have been proposals for creating air bubbles or an air layer on the underwater surface of a ship for the purpose of reducing the friction of such ships.

Examples of the techniques for jetting bubbles into water are disclosed in prior art such as: (1) Japanese Patent Application, First Publication, S50-83992; (2) Japanese Patent Application, First Publication, S53-136289; (3) Japanese Patent Application, First Publication, S60-139586; (4) Japanese Patent Application, First Publication, S61-71290; (5) Japanese Utility Model Application, First Publication, S61-39691; (6) Japanese Utility Model Application, First Publication, S61-128185.

Also, a technique of forming an air layer in a concave part of the ship's bottom is disclosed in (7) Japanese Utility Model Application, First Publication, S61-128184.

These techniques are based on ejecting and blowing the pressurized air from a compressor through a plurality of holes or porous plates into the water.

However, with those methods based on jetting only pressurized air though a plurality of holes, it is difficult to obtain fine bubbles, and the buoyant air bubbles are easily separated from the underwater surface of the ship, resulting that the friction reduction is effective only in a narrow range of the surface. With the method based on porous plates, a large amount of energy is consumed in blowing air bubbles through the porous plate, generating a pressure drop through the plate, resulting that the consumption of energy used to blow out the bubbles is larger than the energy savings in reducing the fictional resistance. None of the techniques mentioned in prior art (1) through to (6) has matured into a practical technology. The technique disclosed in prior art (7) has also not come into practice, because it is thought that the large consumption of air needed for the technique is impractical.

This invention is presented in the view of such existing state of the present art, and has the following objectives:

1) To improve energy balance by reducing the frictional forces with low expenditure of energy, thereby effectively reducing the total energy consumption of a navigating vehicle;
2) To develop a simple method for reducing the fictional resistance;
3) To develop an effective technique for adjustments of air bubble mixing ratios and air bubble diameters to reduce the friction;
4) To reduce the friction reliably without being affected by the shape of the ships;
5) To simplify handling of air and water needed for reducing the friction;
6) To develop an apparatus for reducing the friction which is simple to be installed in a ship.

SUMMARY OF THE INVENTION

The method of this invention for reducing the friction of a navigating vehicle comprises, singly or in combination, a technique of injecting an air bubble/water mixture into a boundary layer formed in the vicinity of the submerged surface of a navigating vehicle, and a technique of jetting air bubble/water mixture at an inclined angle away from the submerged surface towards the stern of the navigating vehicle.

The method of reducing the friction on a navigating vehicle includes a combination of a technique of keeping the amount of air bubbles contained in the air bubble/water mixture to be less than 99%, and a technique of keeping the average diameter of the air bubbles to be less than 600μm.

The low friction navigating vehicle of this invention comprises: an air bubble/water mixture generation and supply apparatus disposed on the navigating vehicle; and a fluid ejection opening connected to the air bubble/water mixture generation and supply apparatus for ejecting an air bubble/water mixture formed in the vicinity of a submerged surface of the navigating vehicle at an angle, and in a direction towards the stern of the navigating vehicle.

The invention further includes a combination of the techniques of the angle of ejection of the mixture being about 20degrees; the fluid ejection openings are disposed in the fore and aft direction of the navigating vehicle in staggered positions; the fluid ejection opening is a slit shape; the fluid ejection opening has a plurality of fine holes; the navigating vehicle comprises a double hull structure; the air bubble/water mixture generation and supply apparatus is disposed in the space sections formed between the outer hull and the inner hull; and the air bubble/water mixture generation and supply apparatus is disposed in the vicinity of the fluid ejection openings.

The low friction navigating vehicle of this invention comprises: a plurality of air bubble/water mixture generation and supply apparatuses disposed so as to be spaced in the fore and aft direction in the space sections, formed in a double hull structure between the outer and inner hulls, or in the vertical direction, or in the port and starboard direction; fluid ejection pipes disposed between the air bubble/water mixture generation and supply apparatus and the fluid ejection opening, communicating therebetween and passing through the outer hull of the navigating vehicle; a header disposed in the space section for communicating the air bubble/water mixture generation and supply apparatus with a plurality of fluid ejection pipes; shut-off valves interposed in the space sections; and compensators for reinforcing that section of the outer hull where the fluid ejection pipes passes through the outer hull.

The method of generation micro-bubbles of this invention comprises the techniques of ejecting a gas stream through numerous fine holes at right angles to a water stream, and breaking up the gas stream with the water stream to mix the gas bubbles in the water stream.

The apparatus for generating micro-bubbles of this invention comprises: fluid transport pipes having numerous fine holes provided on the side walls and communicating with a water supply device for generating a gas bubble/water mixture; a gas chamber surrounding the outer surface of the side walls of the fluid transport pipes and communicating with the fine holes; and a pressurized gas supply device communicating with the gas chamber for ejecting pressurized gas from the fine holes.

When an air bubble/water mixture is ejected from the ship into a boundary layer, the air bubbles can be delivered more effectively to the desired bottom region in the boundary layer to reduce the friction, compared with the use of air bubbles alone, because of the larger mass of the water and the consequent larger dynamic energy of the air/water mixture. Furthermore, primarily because of the utilization of the dynamic energy of the water, there is a thrusting force generated in the opposite direction to the direction of ejection of the air/bubble mixture.

When the air bubble mixture is ejected from the fluid ejection openings in the direction of the stern of the ship, the air bubbles distribute themselves along the underwater surface of the ship, thus reducing the frictional resistance as well as generating a forward thrusting force, There is three orders of magnitude difference in the mass of air and water, and therefore, even a 1% addition of water to air bubble/water mixture has an affect on the effectiveness of bubble delivery and thrust generation.

In general, small sizes of air bubbles are more effective in reducing friction, and it is necessary that the average diameter of the air bubbles be not more than 600μm.

The reduction in friction is improved when the angle of ejection of the air bubble/water mixture is about 20degrees to the underwater surface.

The size of the air bubbles becomes adjustable by including the bubbles in the air bubble/water mixture, and the mixture further serves to maintain the size of the air bubbles. Therefore, the size of the air bubbles is less subject to influence by the size or the shape of the fluid ejection opening.

When the ship has a double hull construction, the space between the outer and the inner hulls can be utilized, and the air bubble/water mixtures can be produced near the ejection openings, thereby enabling to eject the mixture from a plurality of holes and locations of the ship, by staggering the fluid ejection openings in the direction of the bow and the stern of the ship, in the vertical directions, and in port or starboard directions of the ship.

When the fluid jet pipes are provided, between the fluid ejection opening and the air bubble/water mixture supply means, through the outer hull of the ship, one air bubble/water mixture supply means can supply the air bubble/water mixture to many places through a header, and valves are operated to open or close the fluid ejection openings to isolate from or communicate with the outside environment of the ship.

Regarding the method and the apparatus for generating micro-bubbles for the purpose of reducing the frictional resistance, by ejecting pressurized air from a gas chamber through numerous holes into a water stream flowing in fluid transport pipes, the air stream is broken up by the water stream and the bubbles formed by the breaking process become mixed in the water stream, and the mixture is delivered to the desired locations of the ship through the fluid delivery pipe.

The air bubbles in the air bubble/water mixture are governed by such factors as the diameter, the number of the fine holes, the air flow rate and the fluid stream velocity.

DETAILED DESCRIPTION OF THE PREFERRED EMBODIMENTS

The following presents an example of applying the method of reducing the friction of a navigating vehicle, and an apparatus for generating micro-bubbles for use therefor to ships such as a tanker or a container ship.

Figure 1:
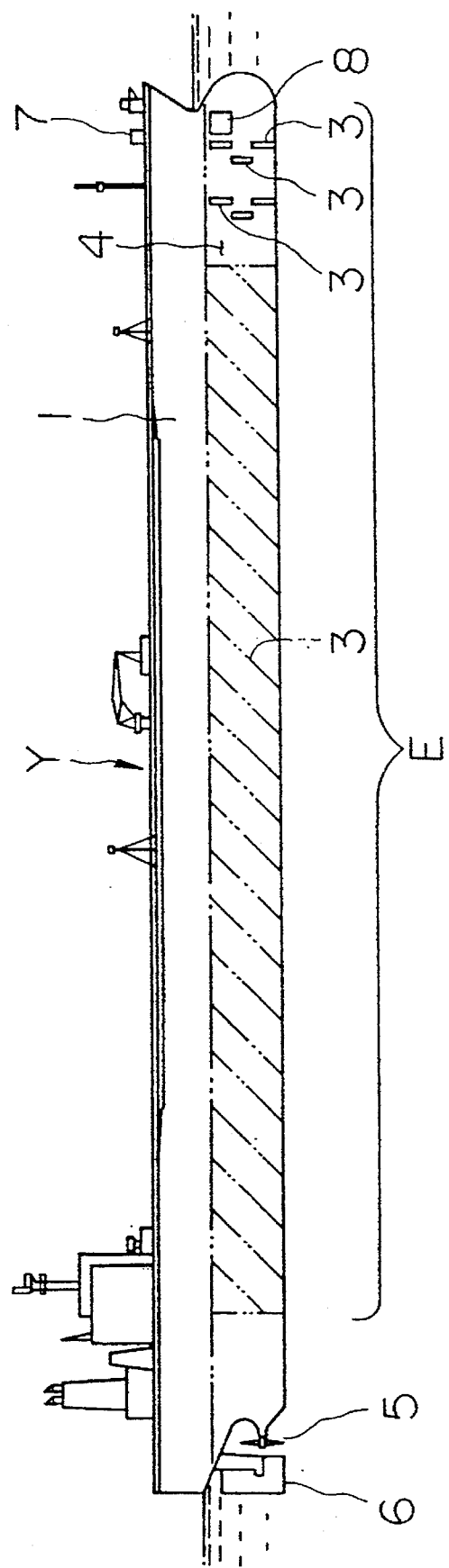
FIG. 1 is a simplified side view of an embodiment of applying the method of reducing the friction of a navigating vehicle of this invention to a ship.
Figure 2:
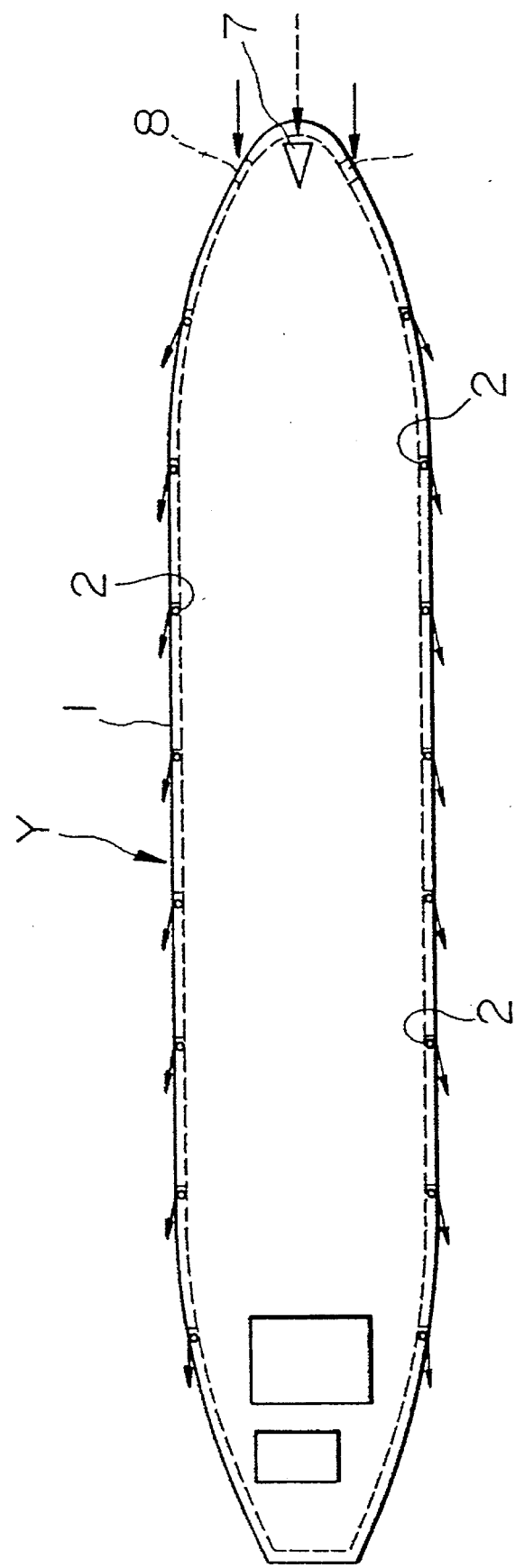
FIG. 2 is a simplified plan view of an embodiment of applying the method of reducing the friction of a navigating vehicle of this invention to a ship.

In FIGS. 1 through to 7, the following reference numerals are used: a low friction navigating vehicle Y; a ship 1; a supply device for air bubble/water mixture (micro-bubble generation apparatus, air bubble/water mixture supply system) 2; fluid ejection openings 3; submerged surfaces 4 (ship surface); a thrust device 5; a rudder 6; air intake openings 7; water intake openings 8.

Figure 3:
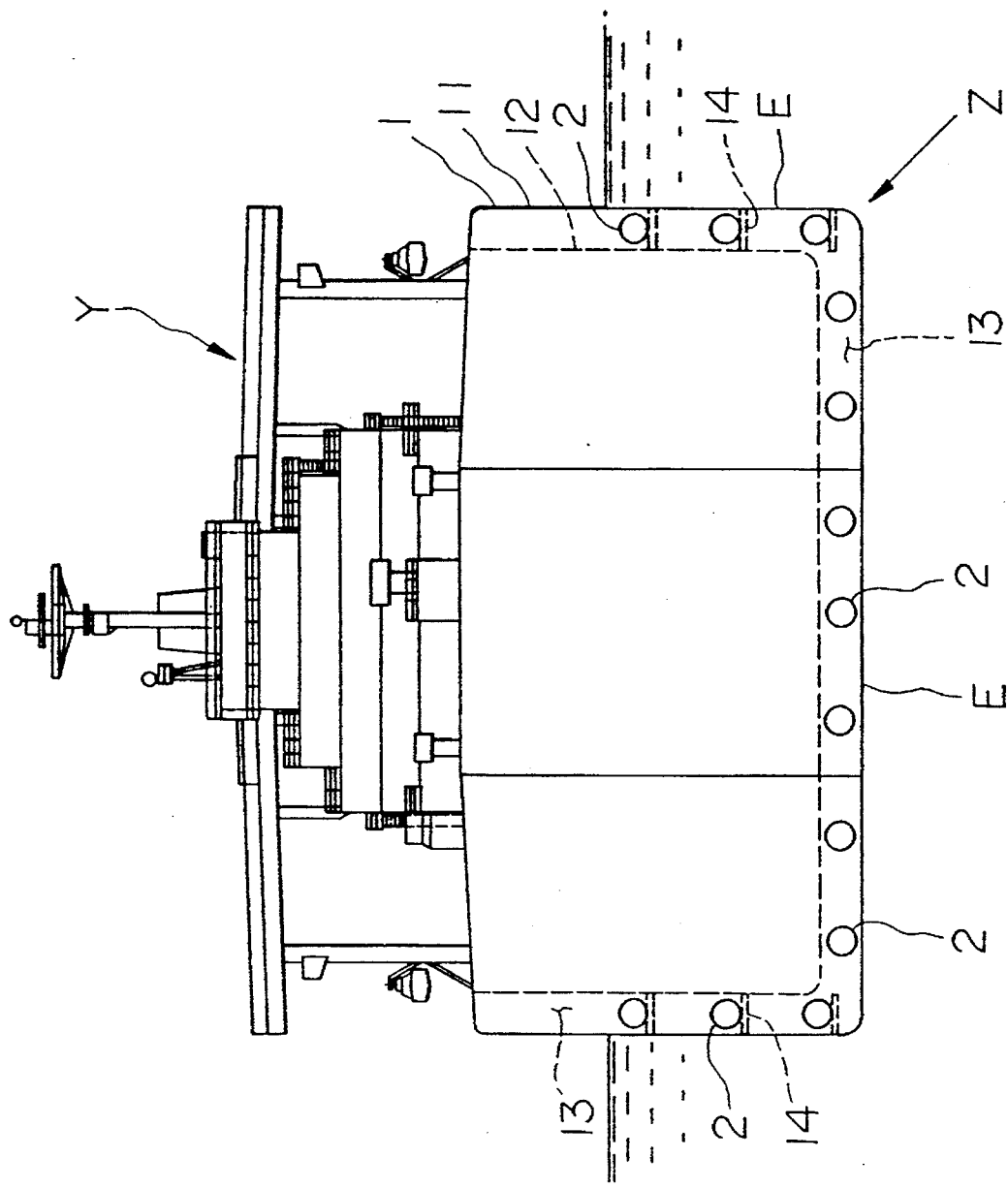
FIG. 3 is a simplified cross sectional front view of an embodiment of applying the method of reducing the friction of a navigating vehicle of this invention to a ship.

The ship 1 in the low friction navigating vehicle Y shown in FIG. 3, is an example of a double hull construction, having an outer hull 11 and an inner hull 12. In the space section 13 formed between the outer hull 11 and the inner hull 12, there are several support structures 14 so that a number of air bubble/water mixture generation apparatuses 2 can be installed spaced apart in the vertical direction as well as in the port and starboard directions.

The air intake openings 7 are disposed looking forward in the front part of the deck, and the water intake openings 8 are disposed also looking forward, below the underwater surface 4 on the port side and on the starboard side.

The air bubble/water mixture supply apparatus 2 supported by the support structure 14 is disposed in suitable locations in the ship 1. It should be capable of supplying air and water at certain fixed rates, and forming a mixture of air bubbles and water before the mixture is ejected from the fluid ejection opening 3.

Figure 4:
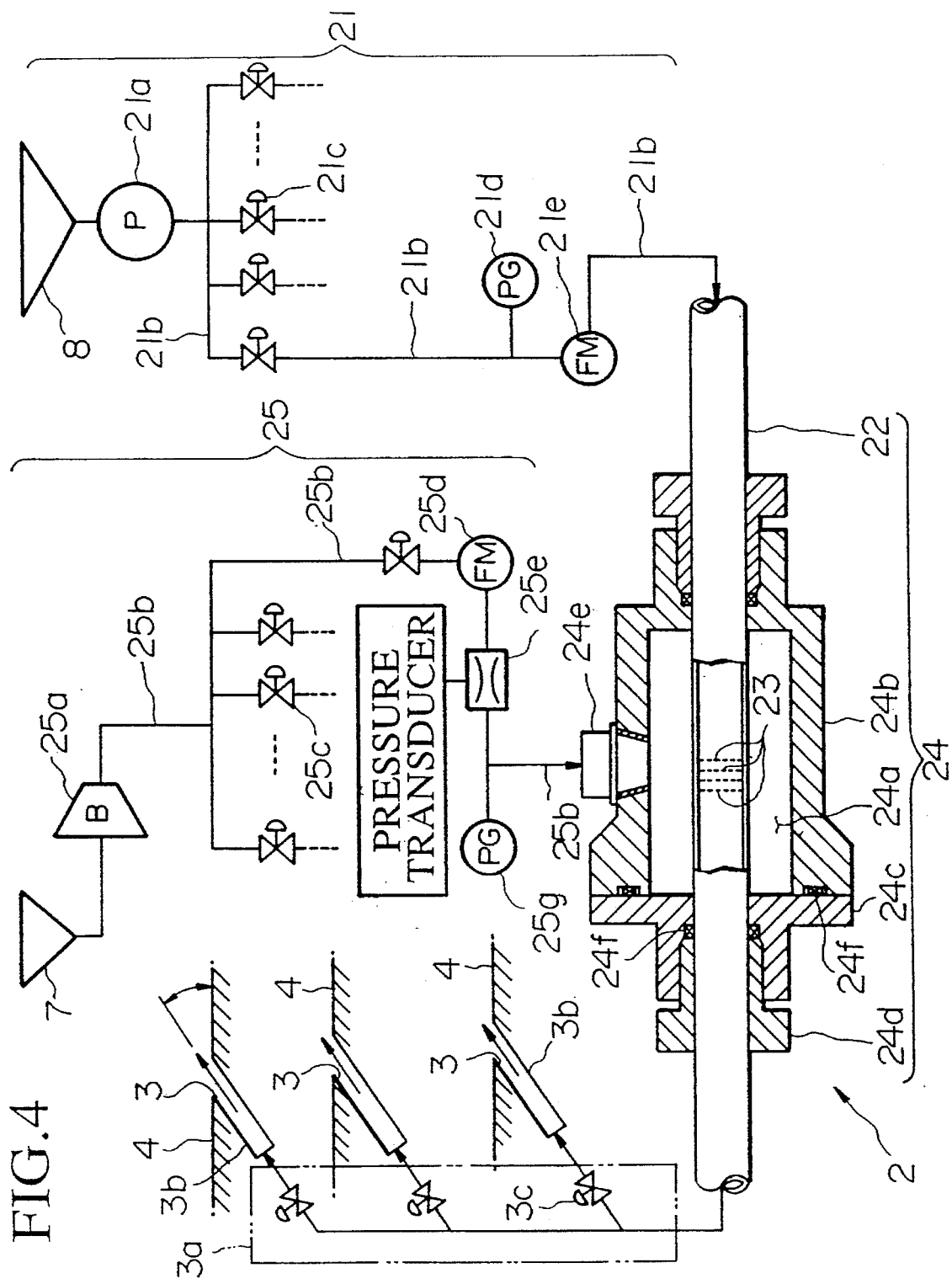
FIG. 4 is a partial cross sectional view of an apparatus of this invention for generating micro-bubbles for explaining the use of the apparatus shown.

The air bubble/water mixture supply apparatus 2, as shown in FIG. 4, comprises: water intake openings 8; a water supply device 21; fluid transport pipes 22 connected to the device 21; numerous fine holes 23 provided uniformly on the side walls (pipe wall) of the fluid transport pipe 22 at certain spacing in the circumferential and longitudinal directions of the pipe 22; and a gas chamber system 24 surrounding the fine holes 23.

The air bubble/water mixture supply apparatus 2 will be explained next. The water supply device 21, as shown in FIG. 4, comprises a pump 21a connected to the intake opening 8 for taking sea water (water); water supply pipes 21b which are connected to the pump 21a and passing through the outer hull 11 and the inner hull 12 for delivering the water to the required locations in the ship 1; a flow control valve 21c disposed on the supply pipes 21b for controlling the flow volume of the water; supply water pressure meter 21d connected to the supply pipe 21b for measuring the pressure of the supply water; and a water flow meter 21e disposed on the water supply pipe 21b for measuring the amount of water being supplied.

The gas chamber 24, as shown in FIG. 4, comprises: a housing 24b surrounding the space section 24a so as to surround the outer walls of the fluid transport pipe 22 and the fine holes 23; a cap 24c for closing the opening of the housing 24b; a socket 24d for attaching the housing 24b and the cap 24c to the fluid transport pipe 22; a connection plug 24e disposed on the housing 24b for connecting the space section 24a to a pressurized air supply device 25; and sealing members 24f for sealing each of the joints between the fluid transport pipe 22 and the housing, caps 24c and sockets 24d.

The pressurized air supply device 25, as shown in FIG. 4, comprises: a blower 25a connected to the air intake opening 7 for intaking the air (atmosphere); a pressurized air supply pipe 25b connected to the blower 25a and passing through the space section 13 between the outer hull 11 and the inner hull 12 for transporting pressurized air to the connection plug 24e of the air bubble/water mixture supply apparatus 2; air volume control valve 25c interposed on the pressurized air supply pipe 25b for adjusting the amount of air supplied; and an air flow volume meter 25d for measuring the air supply volume; a pressure detector 25e having an orifice restricting the flow path; a pressure transducer 25f connected to the pressure detector 25e for converting the air pressure to electrical signals; and an air pressure meter 25g for measuring the supply pressure in the pressurized air supply pipe 25b.

Figure 5:
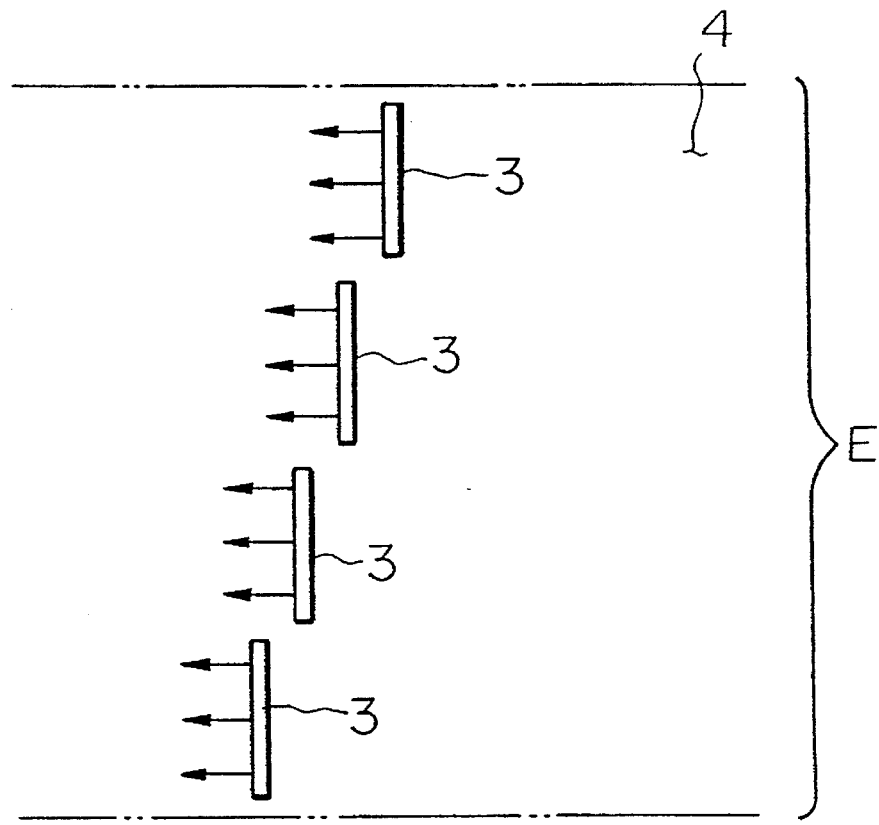
FIG. 5 is an illustration of an example of the fluid ejection opening shown in FIG. 1.
Figure 6:
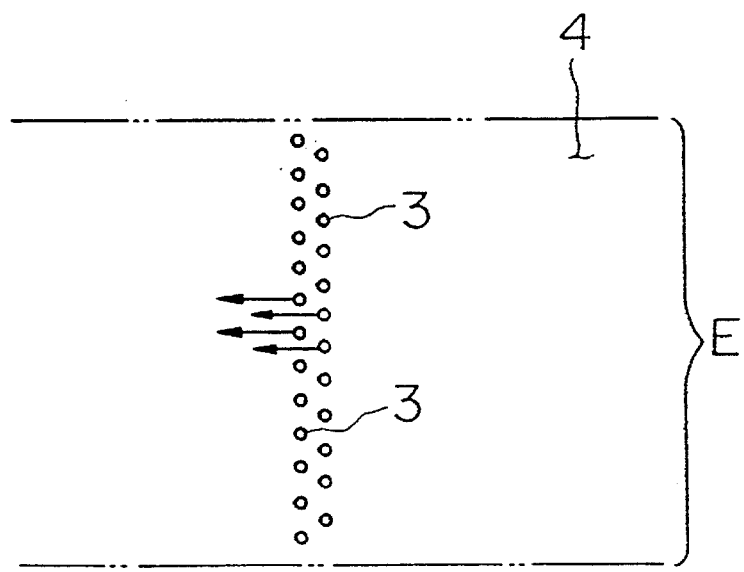
FIG. 6 illustrates another example of the fluid ejection opening shown in FIG. 1.
Figure 7:
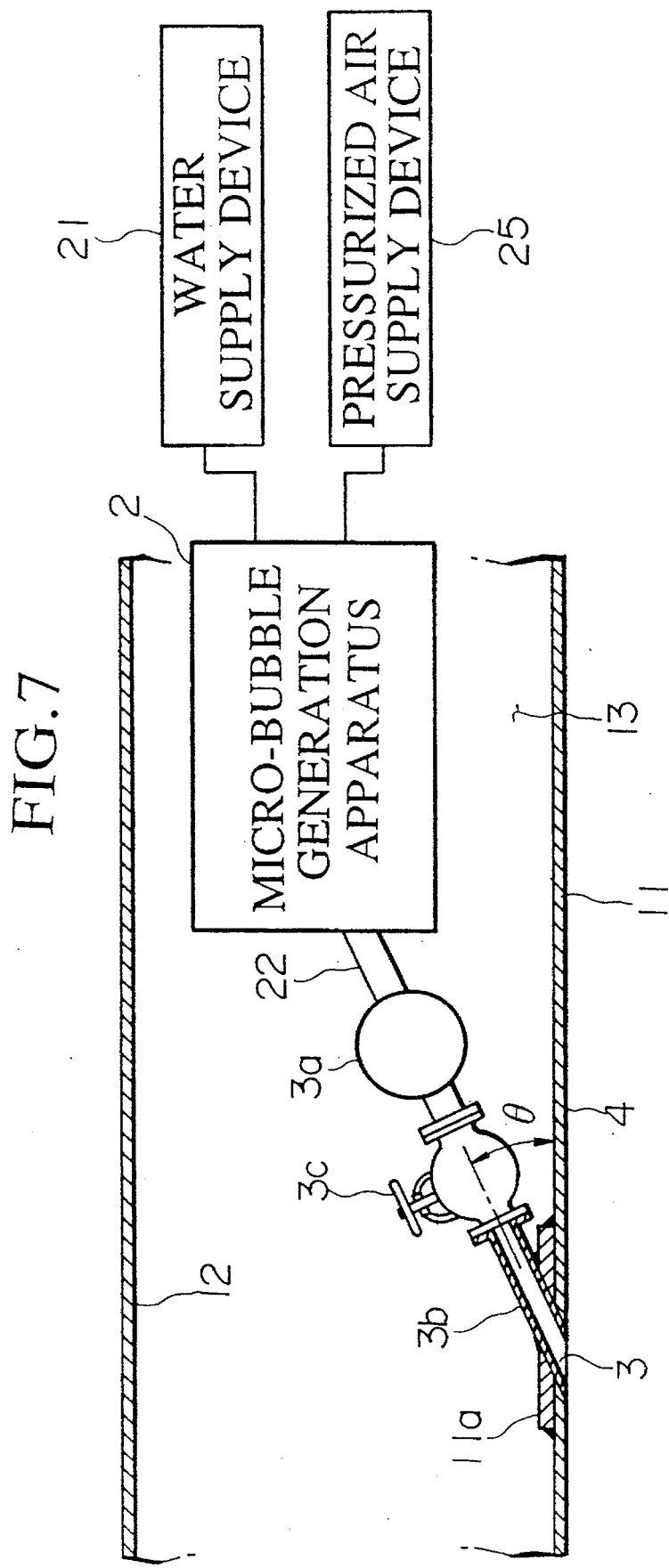
FIG. 7 is a cross sectional view showing the construction of the vicinity of the micro-bubble generation apparatus.

The details of the fluid ejection opening 3 will be explained. As shown in FIGS. 1, 4, 5, 6 and 7, the fluid ejection opening 3 is connected to the air bubble/water supply apparatus 2, and is disposed in an area E which defines the targeted friction reduction area (jetting region) in the underwater surface 4. The shape of the opening is either a slit or fine holes, as shown in FIGS. 5 and 6. The fluid ejection opening 3 is disposed so as to be inclined at an angle θ looking to the stern of the ship with respect to the underwater surface. The angle θ is, for example, set at about 20degrees, as shown in FIGS. 4 and 7.

Here, the vertical and lateral spacings between the fluid ejection opening 3 are to be chosen, as shown in FIGS. 5 and 6, to provide a high density of the openings 3 but not so high as to overlap with each other. The fore and aft spacing will be discussed in more detail later, but they are disposed to maintain the state of the air bubbles.

Because the fluid ejection opening 3 is installed by making a hole through the underwater surface 4 (outer hull 11), it has special construction as shown in FIGS. 4 and 7. The fluid ejection opening 3 comprises: a header 3a connected to the fluid transport pipe 22 of the air bubble/water supply apparatus 2 which is disposed between the outer hull 11 and the inner hull 12; a plurality of fluid jet pipes 3b branched from the header 3a and passing through the outer hull 11; a shut-off valve 3c disposed on the fluid jet pipe 3b for connecting or isolating the space section 13 and the outside (sea water etc.) and a compensator 11a integrally disposed on the outer hull 11 and the fluid jet pipe 3b for strengthening the fluid jet pipe 3b.

Figure 8:
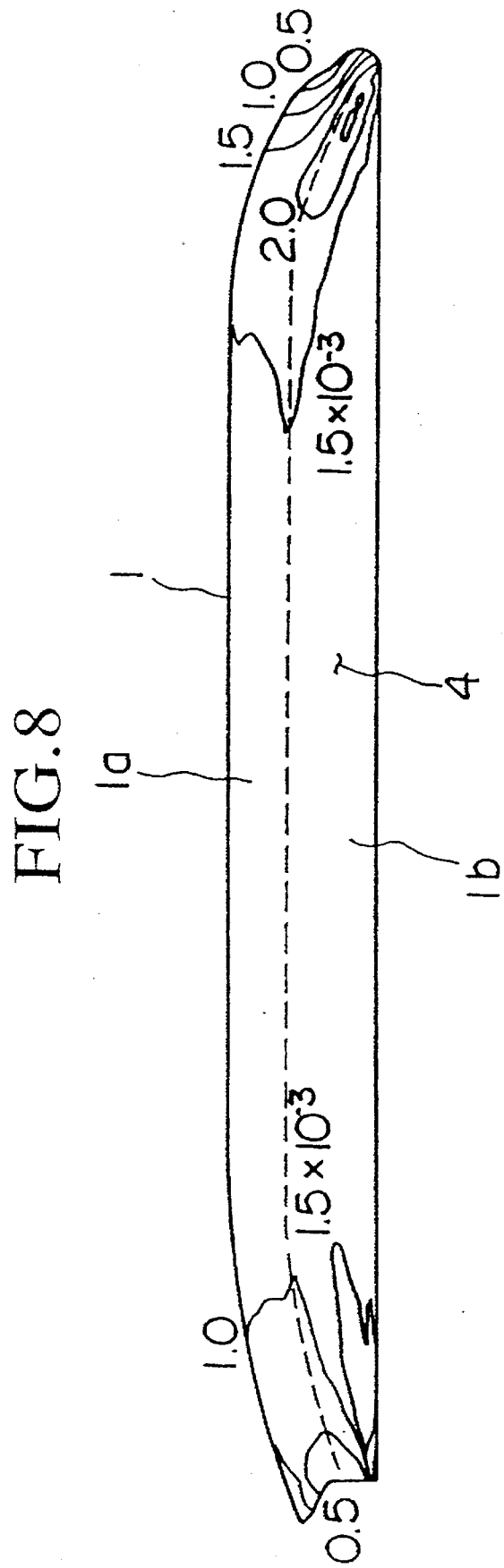
FIG. 8 shows a distribution of the coefficient of friction on an underwater surface for a large tanker vessel obtained by computer analysis.

FIG. 8 shows a computer analysis of the distribution of the coefficient of friction on the underwater surface 4 of a ship 1 of a tanker in the 200,000 to 300,000 ton class. Here, the Reynolds number associated with the shape of the ship 1 is $2.43 \times 10^9$.

It is to be noted that the results, of the distribution of coefficient of friction shown in FIG. 8 pertains to the right half of the underwater surface 4, seen in the direction Z in FIG. 3.

It is also seen that the coefficient of friction Cf at the ship side 1a is somewhat different from that of the ship bottom 1b, and that the values are slightly less in the stern side of the ship 1. Therefore, the targeted friction reduction area E excepts the stern region, to prevent the effects of the phenomenon of cavitation caused by incorporating the air bubbles in the thrust device 5.

Figure 9:
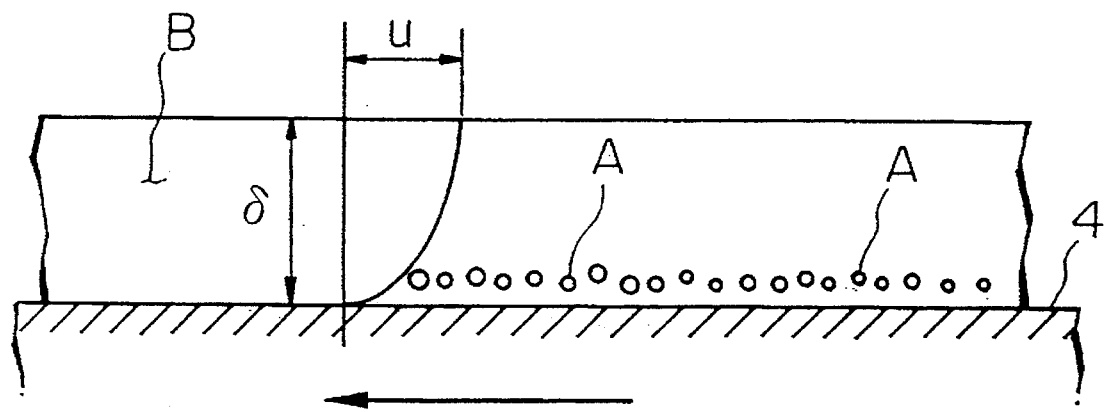
FIG. 9 shows a velocity distribution in the boundary layer formed in the underwater surface of the large tanker shown in FIG. 8.

FIG. 9 shows the velocity distribution in the boundary layer B formed in the submerged surface 4.

When the ship 1 is travelling in the direction of the arrow, the relative velocity u of the water with respect to the underwater surface 4 increases as the distance δ from the underwater surface 4 increases.

The thickness of the boundary layer B in this instance, that is, the thickness at which the relative velocity u is the same as the travelling velocity of the ship 1, is about 1.2m for a tanker in the 200,000 to 300,000 ton class, and 1.0m for a container ship in the same class.

Therefore, the ejection distance of the air bubble/water mixture from the air bubble/water mixture ejection device 2 is controlled so that the air bubbles (micro-bubbles) are formed within such boundary layer distances, and that the small diameter bubbles (micro-bubbles) are formed in the vicinity of the underwater water surface 4.

The method of reduction of friction on the low friction navigating vehicle Y using the air bubble/water mixture supply apparatus (micro-bubbles generation and supply apparatus), and the method of generating the micro-bubbles will be explained in the following.

When the water supply device 21 is operated, the sea water and the like sucked in from the intake openings 8 is pressurized by the pump 21a, and is transported to the fluid transport pipe 22 via the water supply pipe 21a. The water stream is created inside the fluid transport pipe 22, and the water is distributed by the header 3a into the plurality of fluid ejection pipes 3b, and is jetted out from the fluid ejection openings 3.

The water pressure and the supply volume is monitored by the supply water pressure meter 21d and the water flow meter 21e, and the volume is adjusted by operating the control valve 21c in accordance with the location of the fluid ejection openings 3.

When the pressurized air supply device 25 is operated, the air sucked in from the air intake opening 7 is pressurized by the blower 25a, and is charged into the gas chamber 24 via the pressurized air supply pipe 25b.

When the pressurized air is discharged through the numerous fine holes 23 into the inner space 24a of the gas chamber 24, the air becomes mixed in the water stream in a state of fine air bubbles.

In this case, when there is a fluid stream inside the fluid transport pipe 22, the air stream ejected from the fine holes 23 and the water stream are crossing each other at right angles, and if the water stream is flowing at a sufficient velocity, it is considered a phenomenon may be occurring that the air stream is broken up by the water stream.

For example, when the diameter of the fine holes 23 is small in respect of the water flow velocity, the air stream is broken up frequently, and innumerable air bubbles are generated and included in the water stream, and the air bubble/water mixture is thereby created and transported in the fluid transport pipe 22 to the desired fluid ejection openings 3.

In this case, the air bubbles in the air bubble/water mixture is governed by the size and the number of the fine holes 3, air volume, and the moving velocity of the water stream.

Because the air bubble/water mixture is generated in the vicinity of the fluid ejection openings 3, by the air bubble/water mixture generation apparatus 2 which are disposed in several locations, the distance between the generation and the ejection of the mixture into the boundary layer in the underwater surface 4 is kept short.

The air bubble water mixture has a large dynamic energy because it contains water having a far greater mass than air, therefore, the mixture can be delivered far more effectively into the desired bottom layer in the boundary layer B, to achieve the purpose of friction reduction, than the case of air bubbles A alone, as illustrated in FIG. 9.

Further, by having the air bubble/water mixture ejecting at an angle towards the stern of the ship 1, as shown in FIGS. 2, 4, 5, 6 and 10 the thrust force is generated in the opposite direction.

In this case also, the generation of thrust by the jet stream of air bubble/water mixture is caused primarily by the dynamic energy of water by the fact that the mass of air and water differs by three orders of magnitude.

For example, even if the water content by volume is only 1 % in the mixture, most of the dynamic energy in the mixture is supplied by the water.

Therefore, to deliver air bubbles A to the desired location in the boundary layer B, or to obtain a large dynamic energy in the air bubble/water mixture, it is effective to increase the water content in the air bubble/water mixture to the extent that it would not damage the friction reduction effect.

When the ship 1 has a double hull structure, the air bubble/water mixture supply apparatus 2 can be easily disposed in the space section 13 between the outer hull 11 and the inner hull 12. A plurality of the devices 2 can be placed in fore and aft, port or starboard side, top and bottom directions, so as to distribute the fluid ejection openings 3 around the underwater surface 4. In so doing, the air bubble/water mixture can be ejected from many places, as shown by the arrows in FIG. 2, or the air bubbles A can be ejected before the air bubbles grow large.

The friction reduction performances of the low friction navigating vehicle Y and the air bubble/water mixture supply apparatus 2 were checked by making a miniature model of the ship 1.

Figure 10:
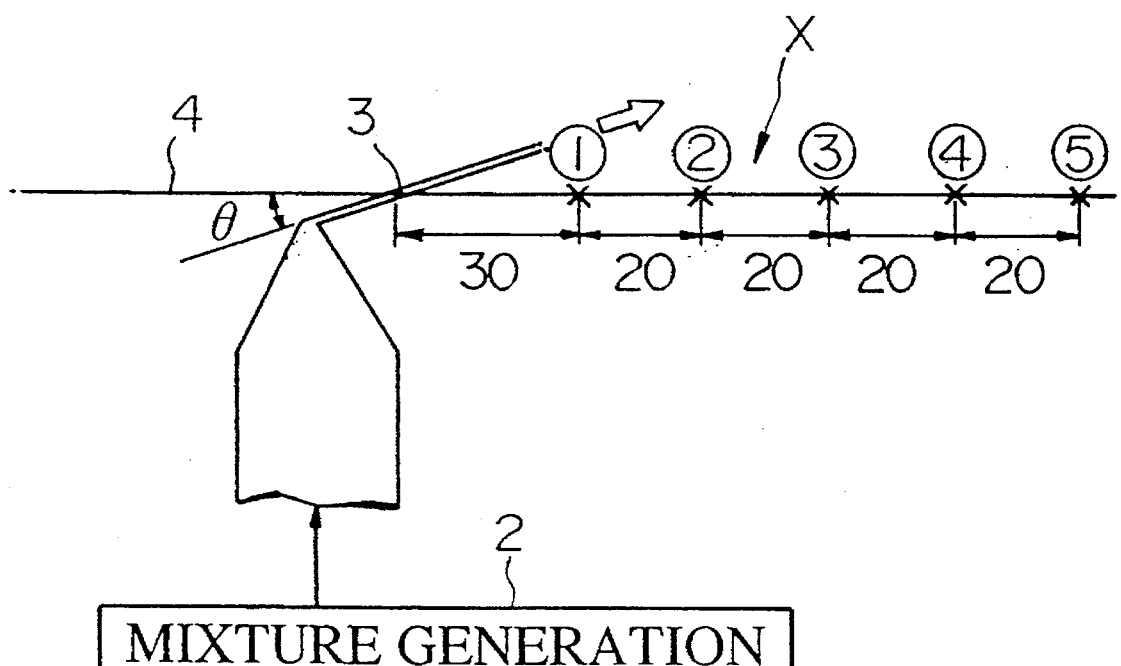
FIG. 10 is an enlarged view showing the measurement points on a model of the low friction navigating vehicle and the fluid ejection holes shown in FIG. 1.

FIG. 10 shows the conditions of checking the performance using the miniature model of the ship 1, and the circled FIGS. refer to Sections 1~5.

Sections 1~5 refer to the locations of measurements taken from the fluid ejection opening 3 and spaced towards the stern of the ship 1. The figures indicate the distances between the locations in mm.

The experiments are explained in the following section.

The ship 1 was placed in the navigating condition, and the air bubble/water mixture was ejected from the fluid ejection opening 3, and the coefficient of friction and other parameters were measured in Sections 1~5.

The conditions were as follows: a navigating speed of 8m/s, a jetting water volume Qw varied in a range of 0.25–7 liter/min, a slit width of 40 mm for the fluid ejection opening 3, a spacing between slits of 0.6 mm and the air flow rate of 5–25 liter/min. The water and air are mixed and jetted out.

The experiments were conducted under the following conditions.

Experiment No. 1

Using the air bubble/water mixture generation apparatus 2 shown in FIG. 4, and the test body X shown in FIG. 10, the air bubble/water mixture was jetted from the fluid ejection opening 3 under the following conditions.

Inside diameter of fluid transfer pipe 22: 8 mm;
Water stream in fluid transfer pipe 22: 0.25–7 liter/min;
Slit width of fluid ejection opening 3: 40 mm;
Slit spacing of fluid transfer pipe 22: 0.6 mm;
Diameter of fine holes 23: 0.5 mm;
Number of fine holes 23: 144;
Air flow volume: 5–25 liter/min;
Transport distance of bubble/water mixture: 150 mm (distance from fine holes 23, to fluid ejection opening 3) Inclination angle θ: 20 degrees.

Experiment No. 2

Size of porous plate: 350 mm×450 mm×10 mm thickness;
Average diameter of holes: 60 μm; Jetting direction from the plate: right angles to the water stream;
Air flow rate: 5–25 liter/min.

Experiment No. 3

Size of porous plate: 350 mm×450 mm×10 mm thickness;
Average diameter of holes: 15 μm;
Jetting direction from the plate: right angles to the water stream;
Air flow rate: 5–25 liter/min.

Common Conditions:

Water flow velocity (navigating speed): 8 m/s;
Static pressure of water flow: 0.26 Kg/cm$^2$.

A parameter for evaluating the reduction in friction was based on a ratio obtained by non-dimensionalizing the Air Jet Volume with an eliminated thickness of the boundary layer, slit width, and the water flow velocity. Expressed otherwise:

Air Flow Rate = Air Jet Volume/(Boundary Layer Thickness•Slit Width •Water Flow Speed)

The degree of friction reduction was expressed by a ratio of (Friction coefficient with air jet CF)/(Friction coefficient without air jet CFO).

Figure 11:
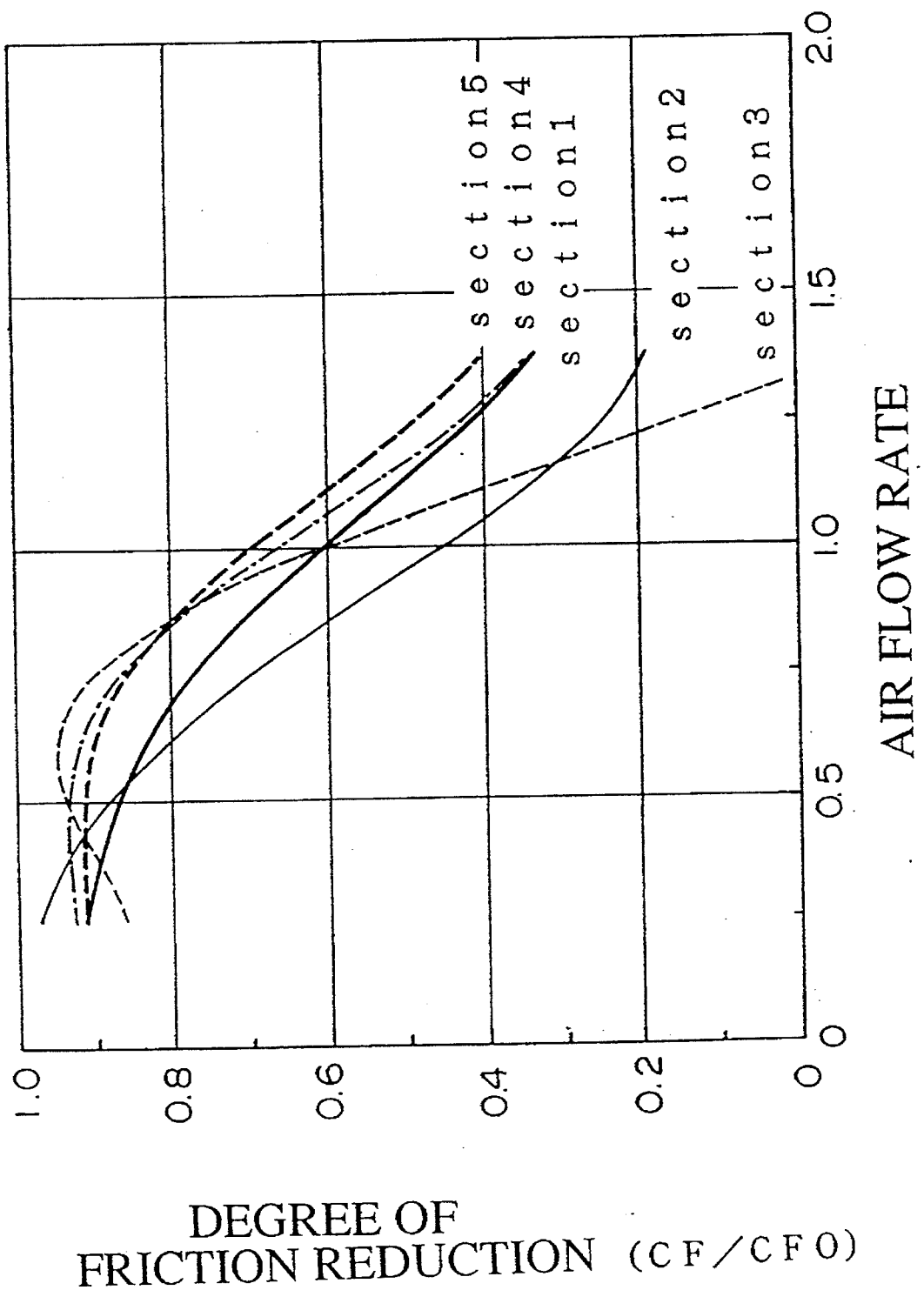
FIG. 11 shows the relationships between air flow rate and the degree of friction reduction at the various measurement points shown in FIG. 10.

The air flow rates and the degrees of friction reduction in the Sections 1~5 are shown in FIG. 11. The water jet volume is 0.25 liter/min (constant). The result is that as the air jet volume increases, the friction reduction effect tended to increase. The behaviors were about the same in all the Sections 1~5.

Figure 12:
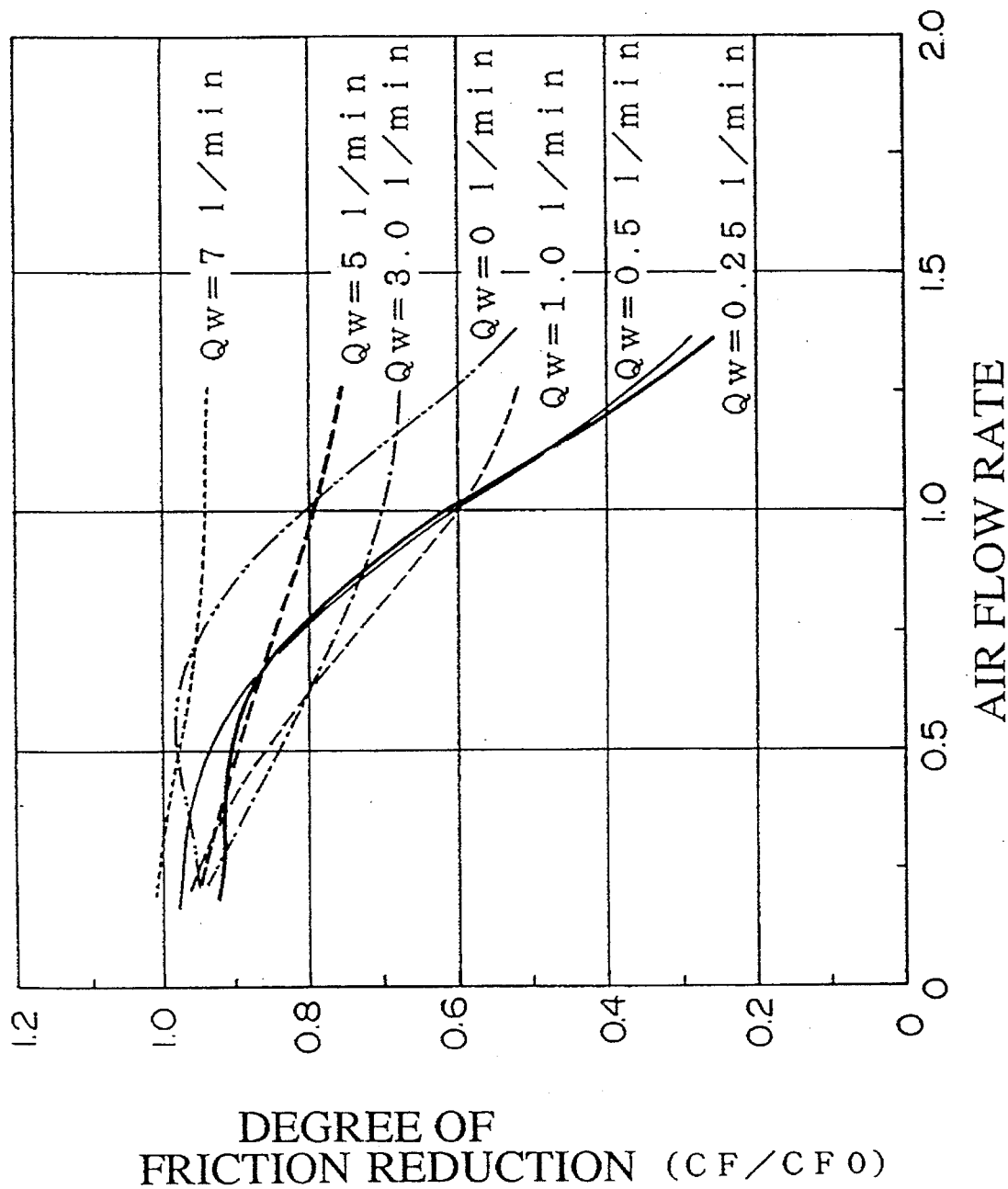
FIG. 12 shows the effects of the water jetting rates on the friction reduction, based on averaged values of the measurements points shown in FIG. 10.

The values obtained from the Sections 1~5 were averaged, and the effect of the water jet volume (Qw) on the friction reduction was studied, and the results are shown in FIG. 12. The tendency was that a higher friction reduction effect was observed by decreasing the water jet volume.

Figure 13:
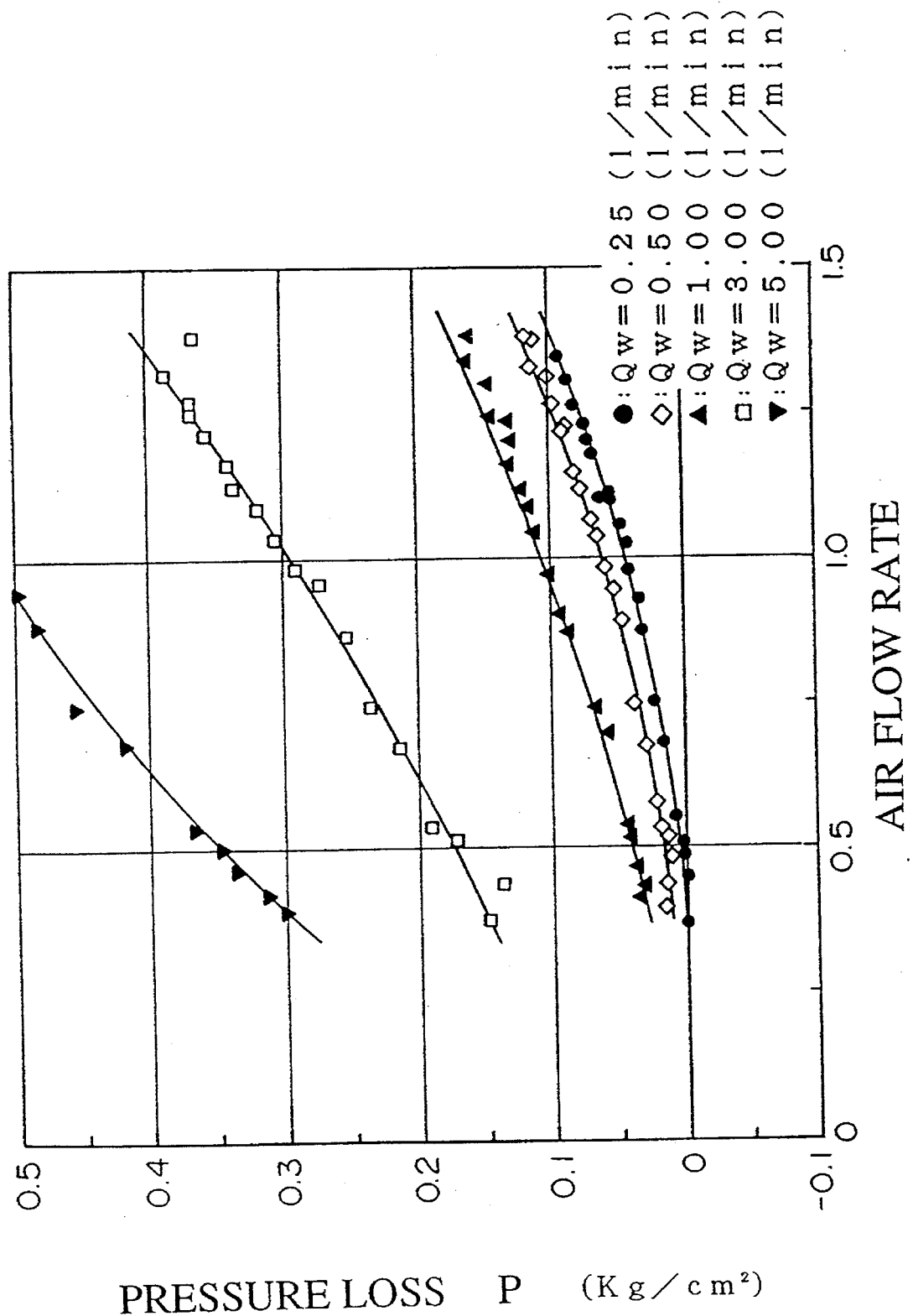
FIG. 13 shows the effects of the air flow rates and the water jetting rates on the friction reduction, based on the model of the low friction navigating vehicle.

The pressure loss caused by the difference between the air jet volume and the water jet volume (Qw) is shown in FIG. 13. The tendency was that higher air jet volume and the water jet volume led to increased pressure loss.

Figure 14:
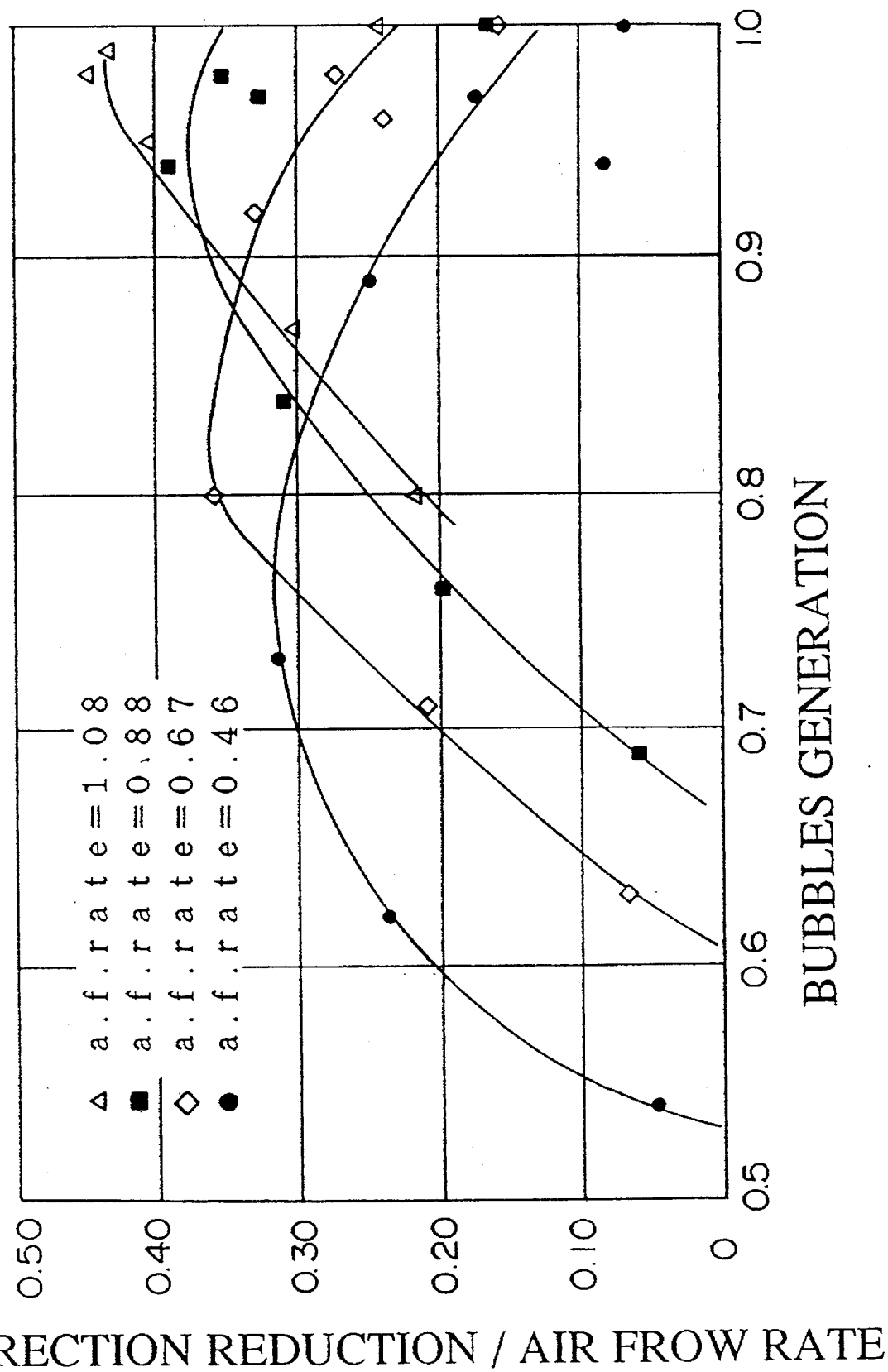
FIG. 14 shows the curves relating a new parameter with the air bubbles generation rates non-dimensionalized by the air flow rate and the air bubble generation rate in the low friction navigation vehicle model.

A new parameter (Rcf) was introduced to find the relationship between the new parameter and the bubbling degree obtained by non-dimensionalizing the air flow rates. The results are shown in FIG. 14. The new parameter is expressed by the following equation.

$$Rcf = (1 - \text{friction reduction degree})/\text{air flow rate}$$
$$= \text{Friction reduction effects/air flow rate}$$

The horizontal axis is based on the bubbles generation non-dimensionalized by the ratio of Air Jet Volume and the total Jet Volume (a sum of Air Jet Volume and Water Jet Volume).

The values of Rcf for each air flow rate show that they are uniformly distributed in a hill shape. The peak positions tend to shift towards the bubbles generation of 1.0 as the air flow rate increases.

The results indicate that there is an optimum value of water jet volume for jetting the air bubbles into a boundary layer effective in reducing the friction. It is thought that as the volume of the water jet increases, the air bubbles become directed upwards. Therefore, if the water jet volume is less than the optimum value, the air bubbles cannot reach the optimum layer, and if the water jet volume exceeds the optimum value, then they are pushed out of the optimum layer.

The peaks tend to shift towards bubbles generation=1 as the air flow volume increases, and this is thought to be caused by the bubbles reaching the layer effective for reducing the friction, without being assisted by the force of the water jet.

The above observations indicate that mixing water in air bubbles enables the mixture to jet out effectively into the particular layer within the boundary layer, which is effective in reducing the friction.

Figure 15:
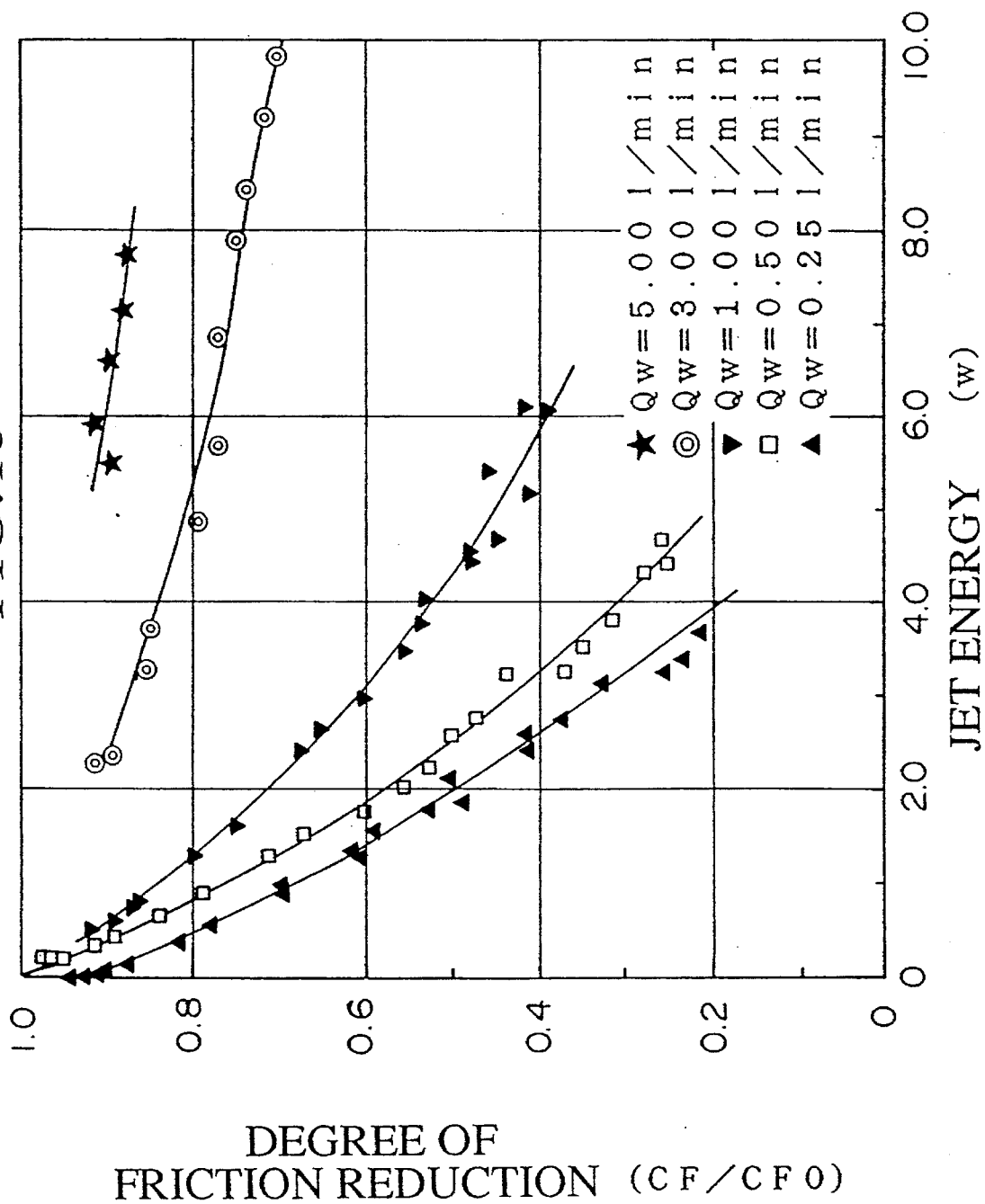
FIG. 15 shows the curves relating the friction reduction, water jetting rates and the total energy in the low friction navigation body model.

From the values of the pressure and the flow volume of the air and water jets, the total energy required for jetting was computed. The results in FIG. 15 showing total energy on the horizontal axis and the degree of friction reduction on the vertical axis, indicate that the effect is high when the water jet volume is between 0.25 and 0.5 liter/min.

Photographs of the air bubbles mixed in the water stream were taken to measure the distribution of their diameters. Some of the measurement results are shown in FIGS. 16 to 22.

Figure 16:
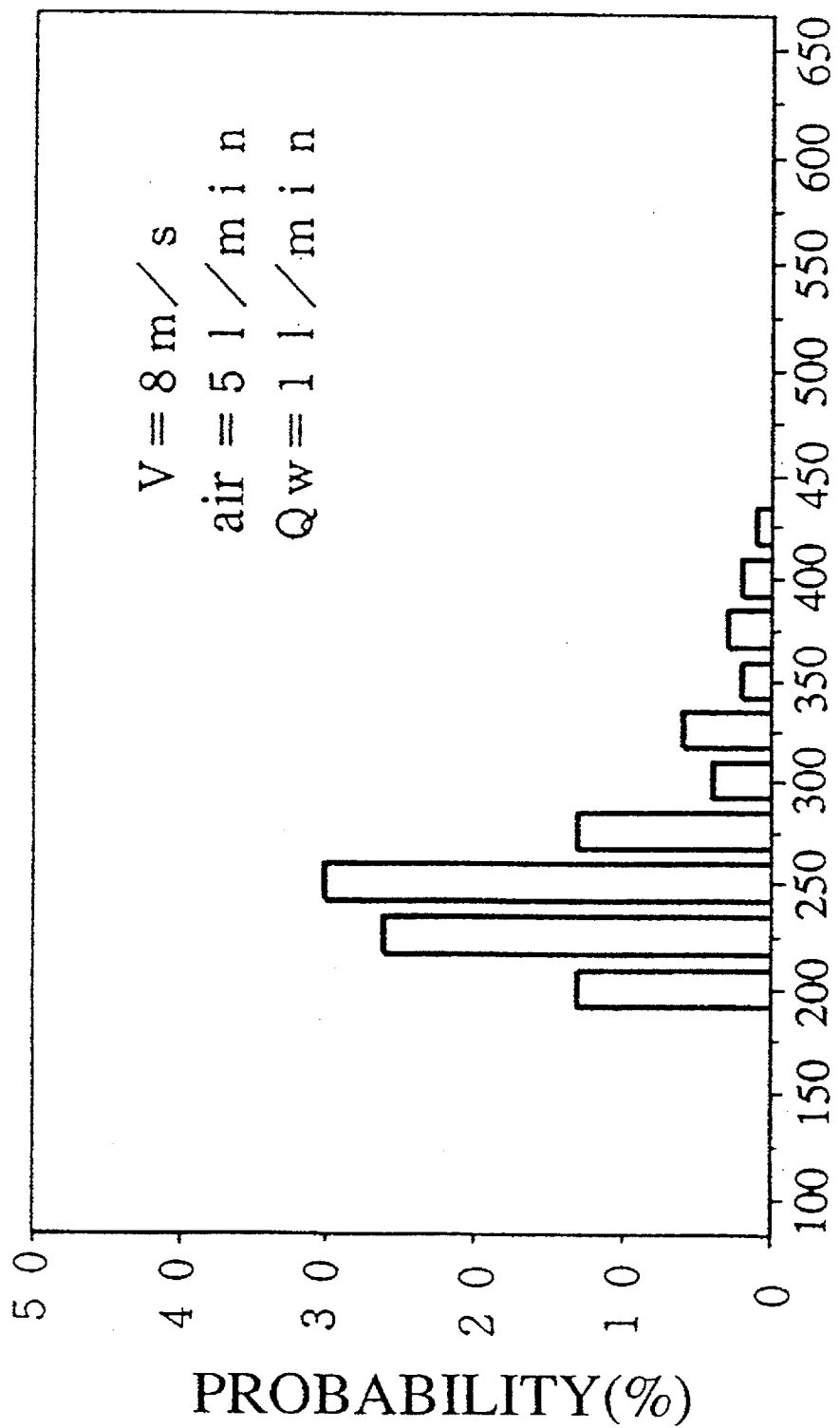
FIG. 16 shows the probability of bubble existence in relation to their diameters, produced by the micro-bubble generation apparatus shown in FIG. 4 operated at an air flow rate of 5 liter per minute.

In FIG. 16, it can be seen that under the conditions of water velocity=8 m/s, air volume=5 liter/min, and water jet volume Qw=1 liter/min, the maximum distribution of air bubbles occurs at 250 μm diameter, and the total range is between 200~425μm. It was observed that even when the diameter of the fine holes 23 is 0.5 mm, smaller sized air bubbles are produced by breaking effect of the air flow by the water stream.

Figure 17:
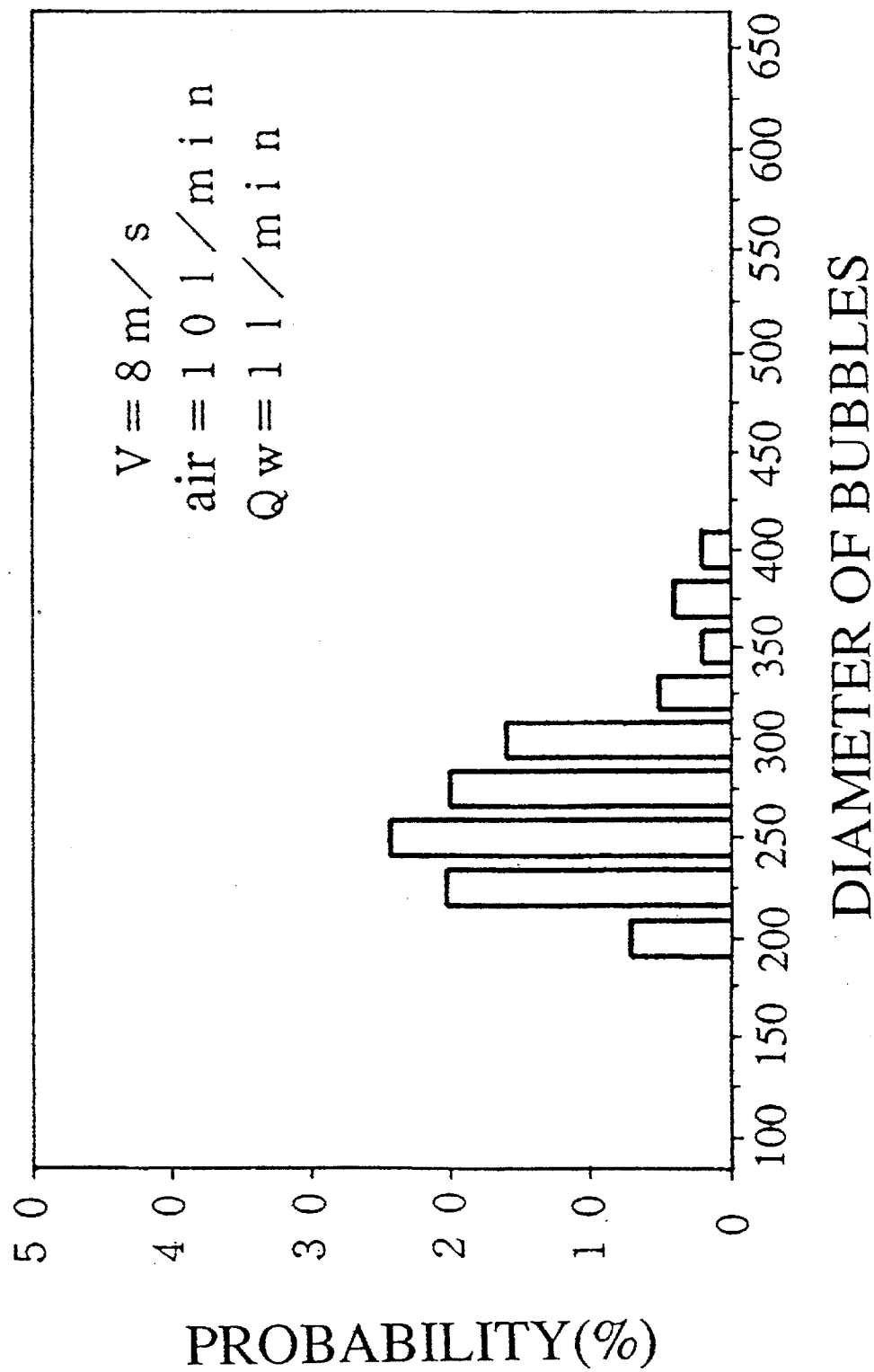
FIG. 17 shows the probability of bubble existence in relation to their diameters, produced by the micro-bubble generation apparatus shown in FIG. 4 operated at an air flow rate of 10 liter per minute.
Figure 18:
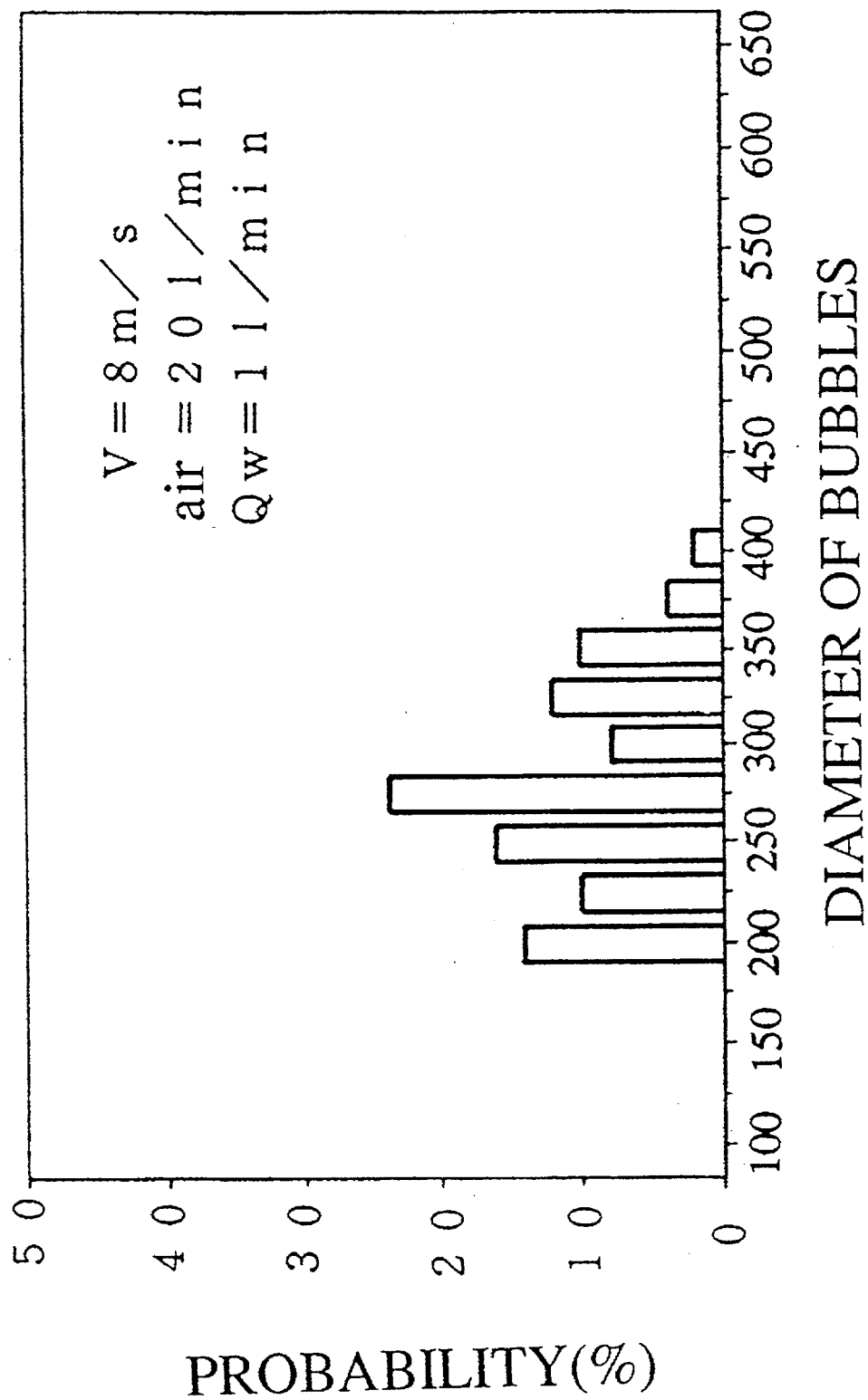
FIG. 18 shows the probability of bubble existence in relation to their diameters, produced by the micro-bubble generation apparatus shown in FIG. 4 operated at an air flow rate of 20 liter per minute.

From FIGS. 17 and 18, it can be seen that when the air flow volume is increased, there is an average tendency for producing larger diameter air bubbles. When porous plates are used, larger air bubbles than the diameter of the pores in the plates are produced without exception.

Figure 19:
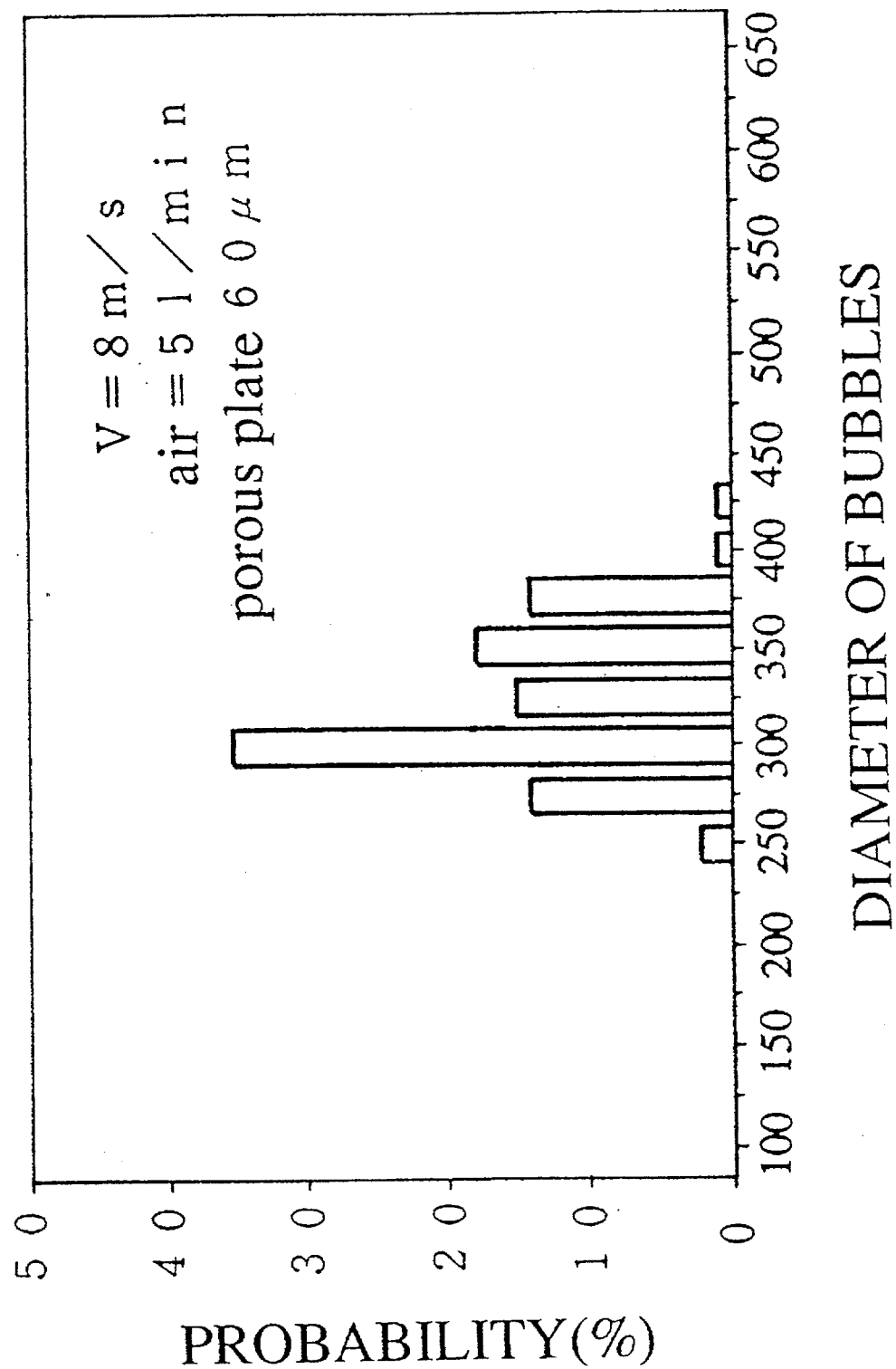
FIG. 19 shows the probability of bubble existence in relation to their diameters, produced in a porous plate having holes of a 60 μm average diameter at an air flow rate of 5 liter per minute.
Figure 20:
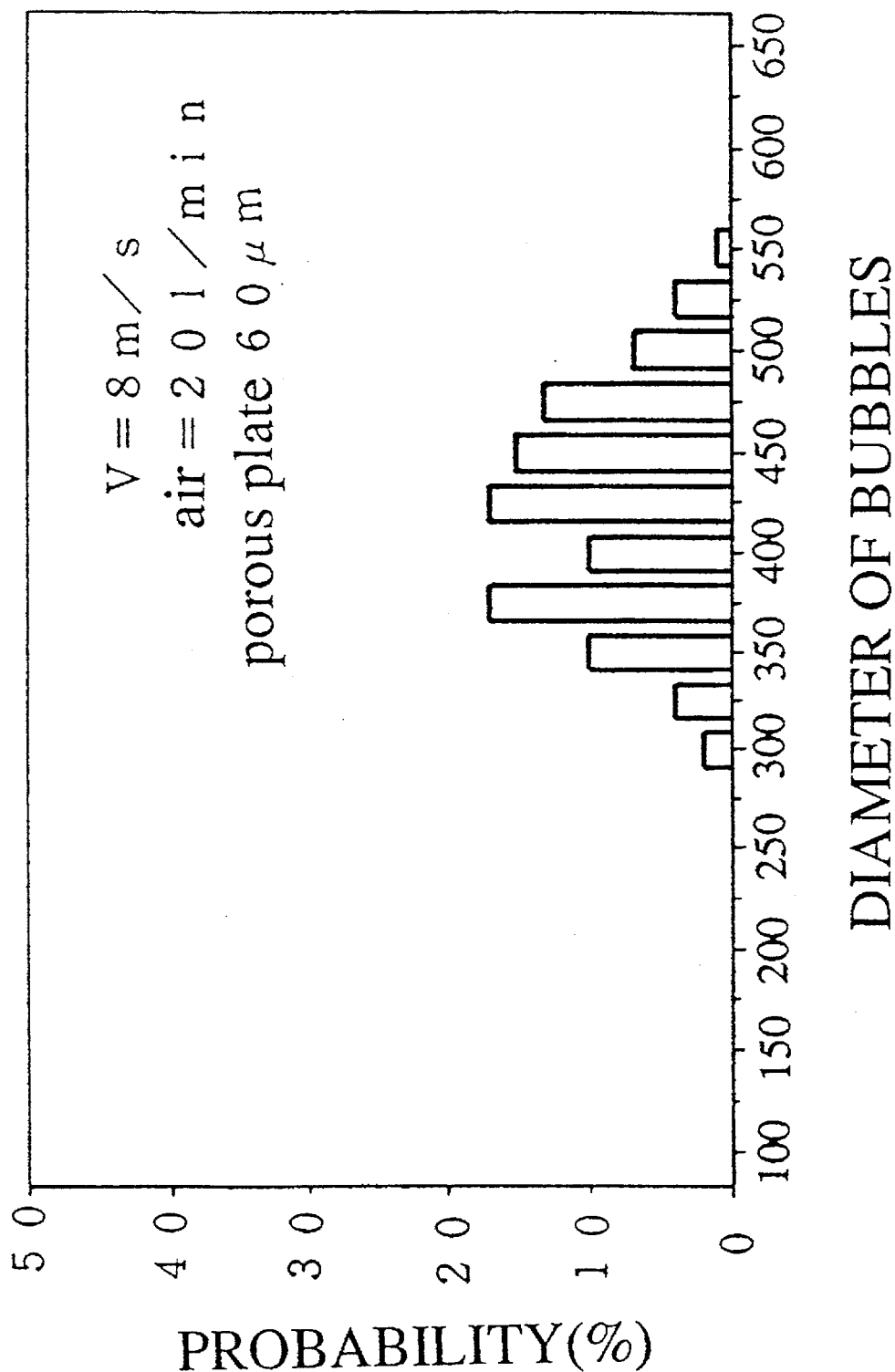
FIG. 20 shows the probability of bubble existence in relation to their diameters, produced in a porous plate having holes of a 60 μm average diameter at an air flow rate of 20 liter per minute.

By comparing FIGS. 19 and 20, it can be seen that when the air volume is increased, the diameter of the air bubbles tend to increase on average.

Figure 21:
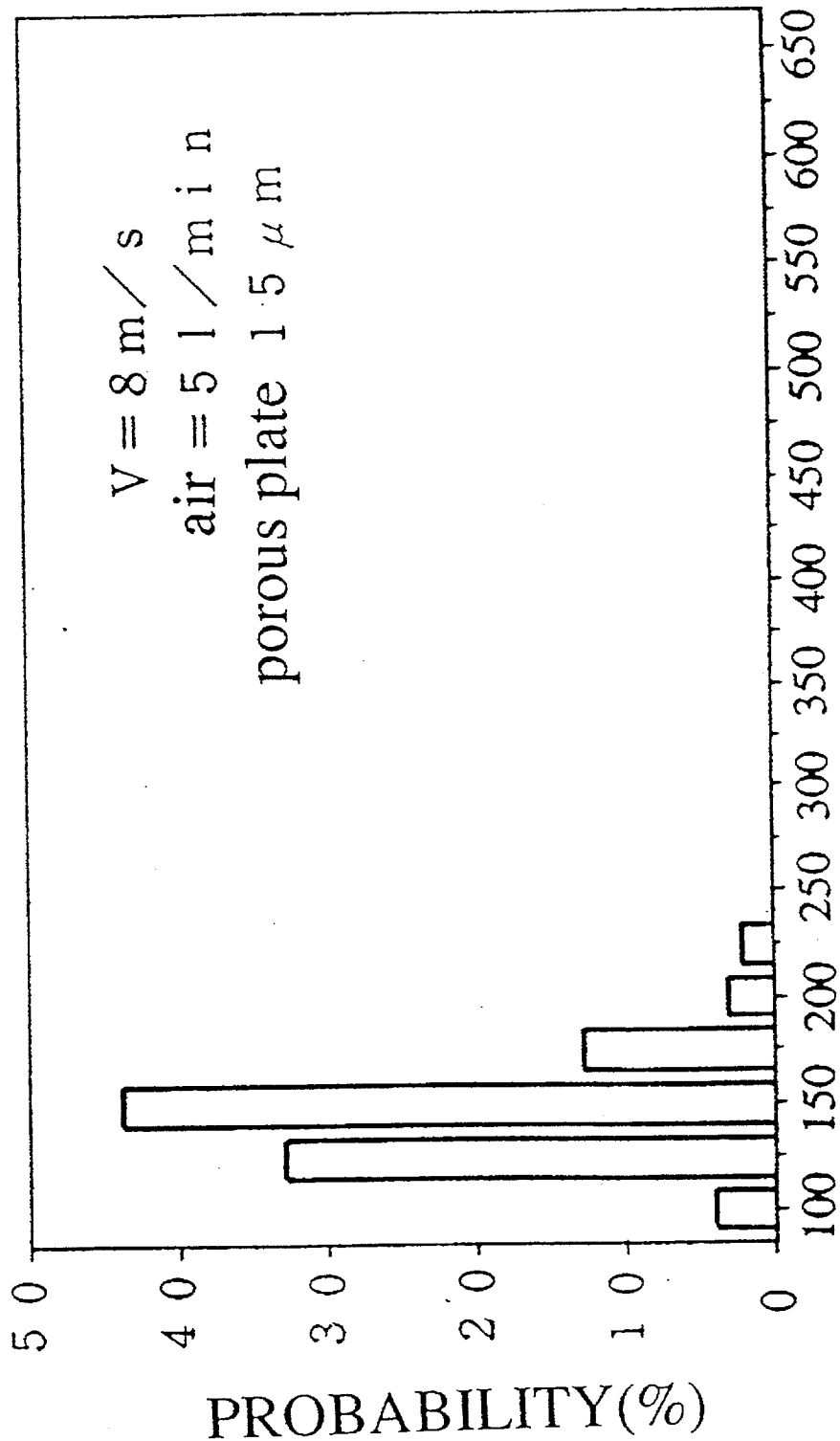
FIG. 21 shows the probability of bubble existence in relation to their diameters, produced in a porous plate having holes of a 15 μm average diameter at an air flow rate of 5 liter per minute.
Figure 22:
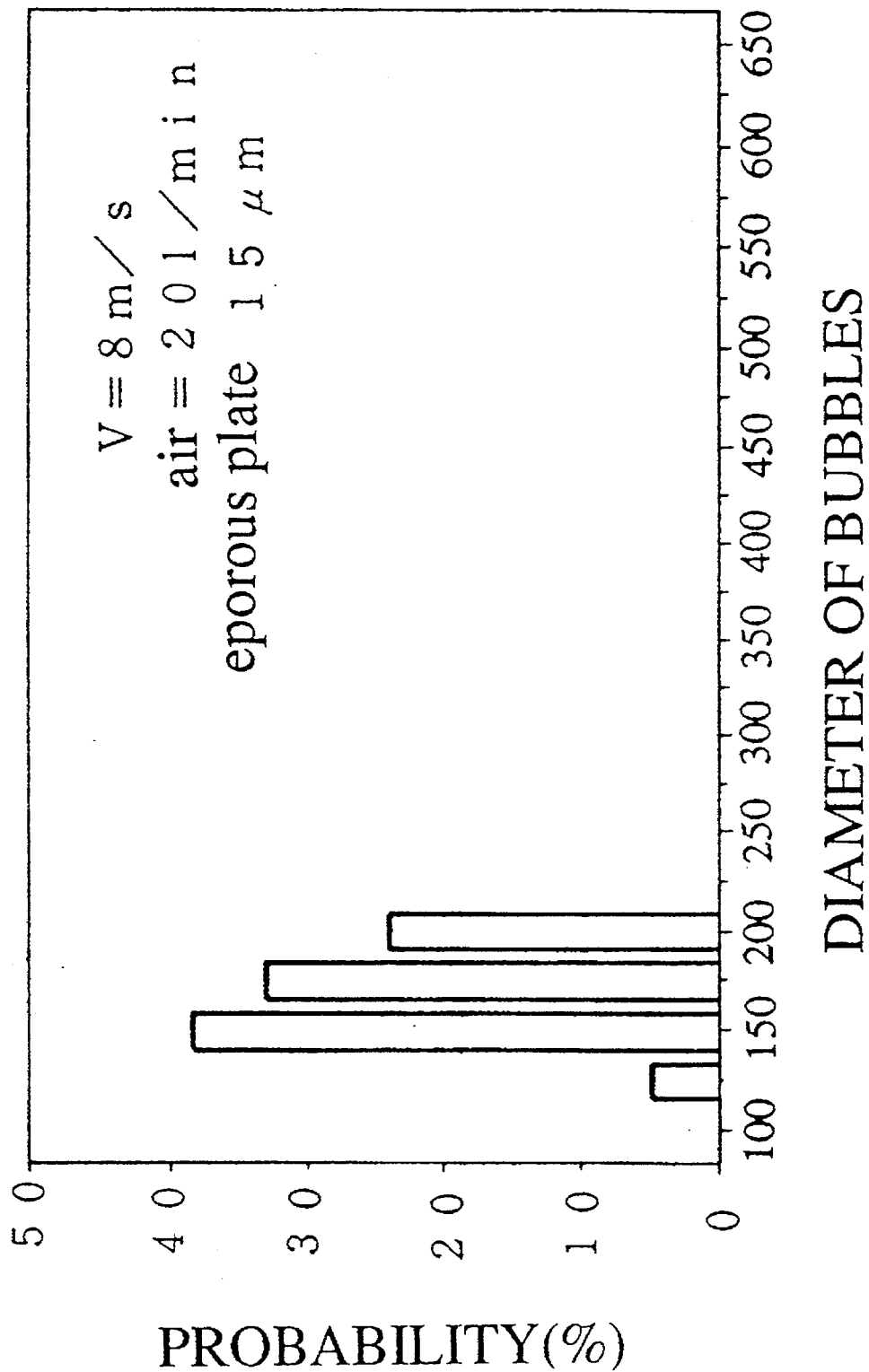
FIG. 22 shows the probability of bubble existence in relation to their diameters, produced in a porous plate having holes of a 15 μm average diameter at an air flow rate of 20 liter per minute.

In the comparison of FIGS. 21 and 22 also, it can be seen that the air bubble diameter tends to increase when the air volume is increased, but in comparison to the results shown in FIGS. 19 and 20, air bubbles of smaller diameter are produced.

From these results, it can be surmised that even in the micro-bubble generation apparatus 2 shown in FIG. 4, it may be easy to generate small diameter bubbles. The quantity and the size of the air bubbles can be adjusted freely by changing the number and the extent of the fine holes 23 formed on the side wall of the fluid transport pipe 22. Also, when the bubbles grow to larger diameters by contact with each other because the bubbles are too large and too many, this situation can be corrected by placing the fine holes 23 near the fluid ejection openings 3 in the test body X.

In the conventional techniques, the main drive such as diesel engines are used, and in this invention of the low friction navigation vehicle, a part of the thrust force is provided by jetting of the air bubble/water mixture. Therefore, the low friction navigation vehicle will become practical if the reduction in energy resulting from decreased friction is larger than the energy required to generating and ejecting the air bubble/water mixture.

The analysis of the average degree of reduction in the friction coefficient, based on the results shown in FIGS. 11 to 15, was performed by defining a momentum inflow rate h and using the air flow volume rate qa as a parameter. The results of analysis are shown in FIG. 23.

The momentum inflow rate is defined by a ratio between the the dynamic energy lost due to friction per unit time (i.e. friction itself) and the dynamic energy per unit time of the air bubble/water mixture injected into the bottom of the boundary layer.

Figure 23:
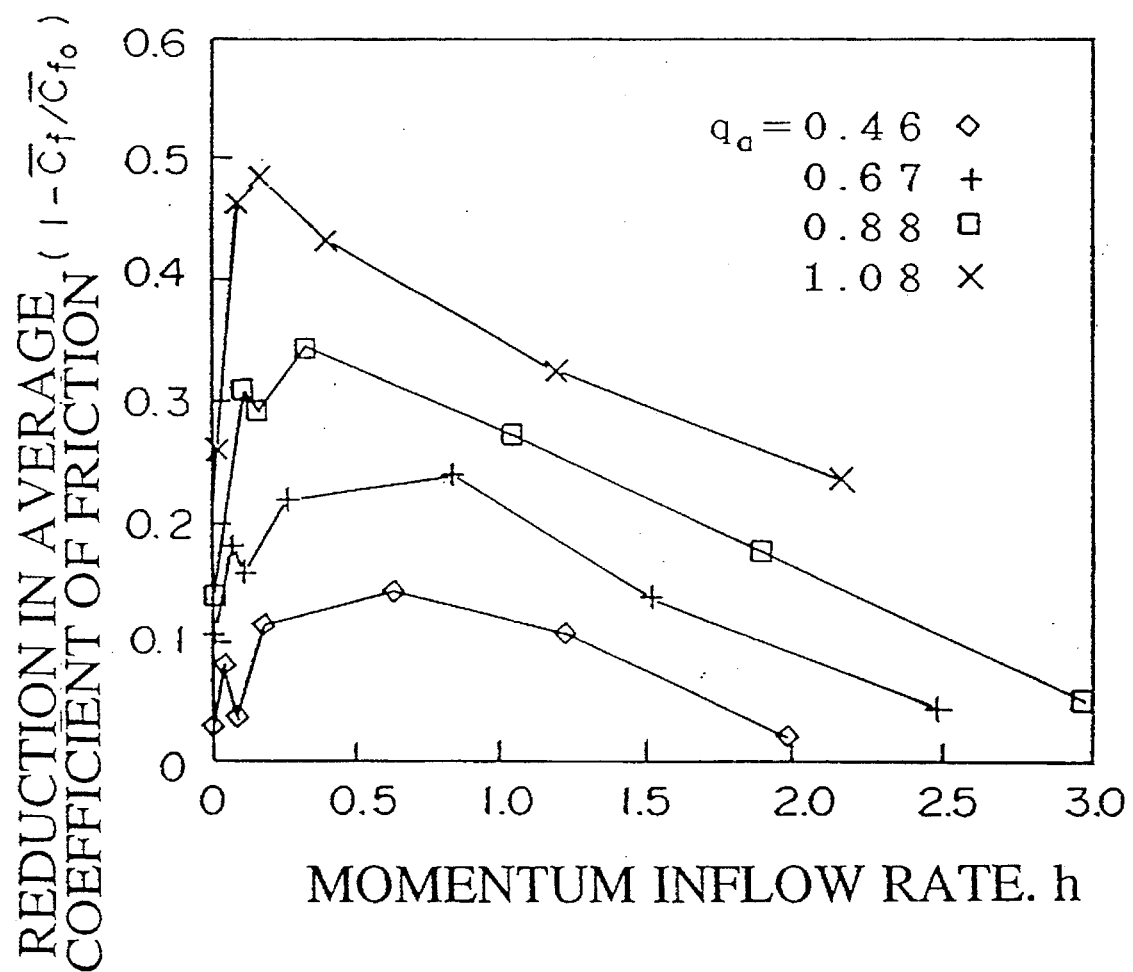
FIG. 23 shows the relationship between the average friction reduction and the momentum inflow rates.

From FIG. 23, it can be seen that when the air flow rate qa is increased, the degree of reduction in the average friction coefficient is also increased, and furthermore, its behavior is roughly symmetrical with respect to the momentum inflow rate h.

Here, when the degree reduction in the average friction coefficient is normalized by a quantity obtained by the air flow rate qa raised to the power of 1.3, and plotted against the momentum inflow rate h, all the results irrespective of the air flow rate qa, come to lie approximately on one curve.

Figure 24:
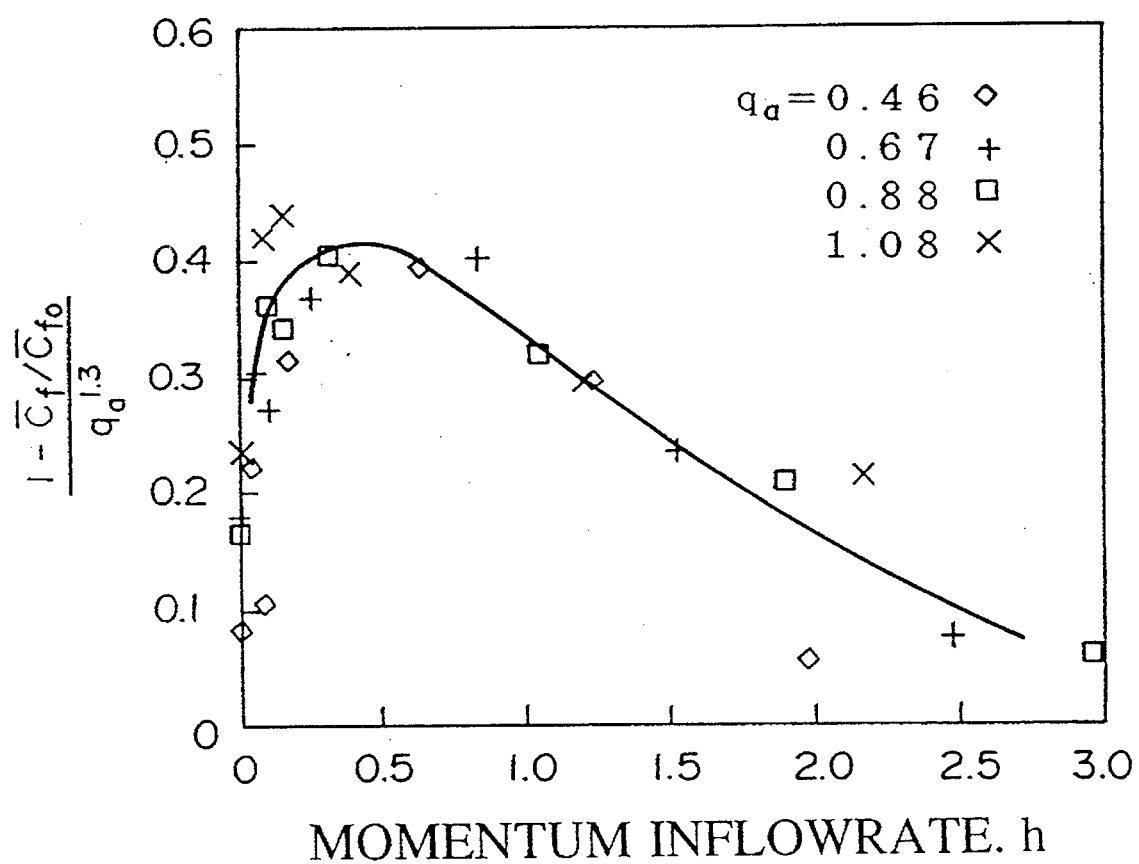
FIG. 24 shows the same relationship shown in FIG. 23 normalized by dividing the values on the vertical axis by the air flow rates raised to the power of 1.3.

An example of calculations of energy reduction, based on the results of FIG. 24 will be presented below.

The assumptions are:

(1) The required driving power for a ship having no provisions for friction reduction to operate at a cruising speed is 1 HP.

(2) The frictional resistance represents 90% of the overall resistance to cruising.

(3) Other resistances such as wave drag and viscous drag represent 10%.

(4) The degree of reduction in friction coefficient produced by jetting the air bubble/water mixture is 0.4. This corresponds to setting the degree of reduction (average of CF/CFO) to 40% when the the mixture is injected ideally into the optimum boundary layer.

(5) The angle of inclination of jetting of the air bubble/water mixture is 20 degrees, making Cos 20=0.94.

(6) Select a momentum inflow rate h=0.3. This means that 30% of the loss of dynamic energy due to friction is supplied to the boundary layer by the air bubble/water mixture. For a unit time, this value represents the frictional resistance itself.

Example of Calculation (the case of jetting the mixture over 100% of the underwater surface with an efficiency of 1)

Saving in driving power due to reduction in friction=to 0.9 $HP \times 0.4 = 0.36\ HP$ Total Driving Power=0.1 $HP + (0.9\ HP - 0.36\ HP) = 0.64\ HP$ Energy consumed in micro-bubble generation apparatus=to 0.9 $HP \times 0.3 = 0.27\ HP$, corresponds to assumption (6).

Of the 0.27 $HP$, used to generate the air bubble/water mixture, 94% is used for the driving power (assumption (5)), thus, 0.27 $HP \times 0.94 = 0.25\ HP$.

Therefore, the amount of energy reduction of the low friction navigating vehicle is, from the expression [Total driving power + output from micro-bubble generation apparatus—driving power derived from the air bubble/water mixture]:

Energy reduction=0.64 $HP + 0.27\ HP - 0.25\ HP = 0.66\ HP$

Therefore, the amount of energy saving is:

1.0 $HP - 0.66\ HP = 0.34\ HP$ indicating that the energy reduction is 34%.

From the results presented above, it is thought that the following techniques are effective in this invention.

a) Most of the resistance is caused by frictional resistance, and in view of the results of distribution of coefficient of friction in FIG. 8, it is preferable that a ship for the application of this invention should have a shallow water line.

b) This invention should be applied to ships having a small difference between the length and the width of the ship.

c) This invention should be applied to ships having other shapes.

d) Ejectors should be used as a device to mix water and air.

e) The number of the fluid ejection openings 3 should be increased, and air (bubbles) pressure should be adjusted.

f) The fluid ejection opening 3 should be disposed on all the underwater surfaces of the ship 1 or in fluid machines used in places where the hydrostatic pressure is low.

g) The shape of the fluid ejection opening 3 should have suitable shapes o her than a slit shape.

h) Gases other than air, and liquids other than water should be applied.

i) The fluid transport pipes should be made a double shell or a multi-shell structure to enable jetting air or other gases inwards or outwards to improve mixing of air with water.

j) Develop suitable combinations of diameter, number, type of gas and flow velocities of water for the fine holes 23.

k) Provide fine holes having different diameters so as to produce air bubbles of different diameters.

The following effects are produced by this invention of a method for reducing the friction of a navigation vehicle, a low friction navigation vehicle and a method and apparatus for generating micro-bubbles for reducing the friction.

(1) This invention enable the injection of air bubble/water mixture at a desired location within the boundary layer in the underwater surface of a ship, because of the high dynamic energy of the mixture caused by the large mass of water rather than air bubbles alone to generate an effective method for reducing the friction of the ship.

(2) This invention enables to reduce the consumption of energy for powering the ship, by jetting of air bubble/water mixture, from the underwater surface of the ship, to provide thrust forces opposite to the jetting direction by utilizing the dynamic energy of the water.

(3) By jetting the air bubble/water mixture at an angle to the underwater surface in the stern direction, the mixture can be directed effectively to the boundary layer to improve and enlarge the effects of friction reduction.

(4) By providing air bubble/water mixture, it becomes possible to vary the size of the air bubbles, and enables to eject the mixture while retaining the size of the generated air bubbles.

(5) The above configurations enables to jet out air bubbles effectively without being affected by the size or the shape of the fluid ejection opening.

(6) By applying this invention to a double hull ship, it is possible to dispose a number of the air bubble/water mixture generation apparatuses in the space section between the hulls, and furthermore, it becomes possible to generate the air bubble/water mixture in the vicinity of the fluid ejection openings to reduce the energy loss for ejection.

(7) By enabling to freely adjust the bubble content in the air bubble/water mixture, it becomes possible to generate the optimum amount of air bubbles for the reduction of friction for the ship.

(8) By providing, in the space section, the fluid jet pipes passing through the outer hull of the ship, the ejection of the air bubble/water mixture is facilitated.

(9) By providing a header for connecting a plurality of fluid jet pipe, the distribution of the air bubble/water mixture is facilitated.

(10) The fluid jet pipe in combination with the shut-off valve permits connection to and isolation from the exterior environment of the ship.

(11) The technique is based on jetting air at right angles to s water stream, and breaking up the air stream by the water stream, the variables are easily adjustable to produce a large amount of a suitable air bubble/water mixture.

(12) The technique is based on a water stream and gas stream ejecting from fine holes, therefore, the apparatus is relatively simple, and economical to operate.

(13) Examination of the reduction in friction for navigating vehicle is facilitated by the use of air bubble ejection.

(14) It is easy to adjust the diameter of the air bubbles by adjusting parameters such as the diameter of the fine holes and water flow.

We claim:

1. A low friction navigation vehicle comprising a gas mixture generation and supply apparatus (2) for generating and supplying a gas bubble/water mixture, said gas mixture generation and supply apparatus being carried on a navigating ship (1), and fluid ejection openings (3) communicating with the gas mixture generation and supply apparatus (2) in a submerged surface (4) for ejecting the gas bubble/water mixture towards the stern of the low friction navigation vehicle, wherein said ship (1) comprises a double hull structure, and a plurality of said gas bubble/water mixture generation and supply apparatuses (2) are disposed in space sections formed between an outer hull (11) and an inner hull (12).

2. A low friction navigation vehicle as claimed in claim 1, wherein an angle of inclination of the fluid ejection opening (3) with respect to the submerged surface (4) is essentially 20 degrees.

3. A low friction navigation vehicle as claimed in claim 1, wherein the fluid ejection openings (3) are disposed so as to be staggered in the fore and aft direction of the ship (1).

4. A low friction navigation vehicle as claimed in claim 1, wherein a shape of the fluid ejection openings (3) is a slit shape.

5. A low friction navigation vehicle as claimed in claim 1, wherein the fluid ejection openings (3) has a plurality of fine holes.

6. A low friction navigation vehicle as claimed in claim 1, wherein said air bubble/water mixture generation and supply apparatuses (2) are disposed in the vicinity of the fluid ejection openings (3).

7. A low friction navigation vehicle as claimed in claim 1, wherein the gas bubble/water mixture generation and supply apparatuses (2) are disposed so as to be spaced apart in the space sections (13) in fore and aft directions of the ship (1).

8. A low friction navigation vehicle as claimed in claim 1, wherein the gas bubble/water mixture generation and supply apparatuses (2) are disposed so as to be spaced apart in the space sections (13) formed between the outer hull (11) and the inner hull (12) in vertical directions of the ship (1).

9. A low friction navigation vehicle as claimed in claim 1, wherein the gas bubble/water mixture generation and supply apparatuses (2) are disposed so as to be spaces apart in the space sections (13) formed between the outer hull (12) and the inner hull (12) in port and starboard directions of the ship (1).

10. A low friction navigation vehicle as claimed in claim 1, wherein a fluid jet pipe (3b) is disposed in he space section (13) between the fluid ejection opening (3) and the gas bubble/water mixture generation and supply apparatuses (2), and passing through the outer hull (11) of the ship (1).

11. A low friction navigation vehicle as claimed in claim 10, wherein a header (3a) is disposed in the space section (13) formed between the outer hull (12) and the inner hull (12) for communicating the gas bubble/water mixture generation and supply apparatuses (2) with a plurality of the fluid jet pipes (3b).

12. A low friction navigation vehicle as claimed in claim 10, wherein a shut-off valve (3c) is disposed on the fluid jet pipe (3b) in the space section (13) formed between the outer hull (12) and the inner hull (12).

13. A low friction navigation vehicle as claimed in claim 1, wherein said gas mixture generation and supply apparatus (2) for generating and supplying the gas bubble/water mixture comprises a fluid transport pipe (22) having a plurality of fine holes (23) formed on side walls communicating with a water supply device (21); a gas chamber (24) disposed so as to surround the outer surface of said side walls of said fluid transport pipe (22) and communicate with said fine holes (23); and a pressurizing device (25) communicating with said gas chamber (24) for delivering pressurized gas in said gas chamber (24) and ejecting the gas through said fine holes (23).

* * * * *

UNITED STATES PATENT AND TRADEMARK OFFICE
CERTIFICATE OF CORRECTION

PATENT NO. : 5,575,232
DATED : November 19, 1996
INVENTOR(S) : Kato et al.

It is certified that error appears in the above-indentified patent and that said Letters Patent is hereby corrected as shown below:

On the title page, delete item: "[22] Filed: Dec. 21, 1994" and insert the following PCT information:

--[22]   PCT Filed:      Apr. 28, 1994

[86]   PCT No.:        PCT/JP94/00727

§ 371 Date:     Dec. 21, 1994

§ 102(e) Date:  Dec. 21, 1994

[87]   PCT Pub. No.:   WO 94/26583

PCT Pub. Date:  Nov. 24, 1994--.

UNITED STATES PATENT AND TRADEMARK OFFICE
CERTIFICATE OF CORRECTION

PATENT NO. : 5,575,232
DATED : November 19, 1996
INVENTOR(S) : Kato et al.

It is certified that error appears in the above-indentified patent and that said Letters Patent is hereby corrected as shown below:

Column 2, line 31, delete "20degrees" and insert --20 degrees--.

Column 3, line 28, delete "20degrees" and insert --20 degrees--.

Column 6, line 36, delete "20degrees" and insert --20 degrees--.

Column 12, line 36, delete "o her" and insert --other--.

Column 14, line 30 (Claim 10, line 2), delete "he" and insert --the--.

Signed and Sealed this

Twentieth Day of May, 1997

Attest:

BRUCE LEHMAN

*Attesting Officer*     *Commissioner of Patents and Trademarks*